United States Patent
Li et al.

(10) Patent No.: US 11,722,883 B2
(45) Date of Patent: Aug. 8, 2023

(54) TRANSMISSION METHOD AND APPARATUS

(71) Applicant: Huawei Technologies Co., Ltd., Shenzhen (CN)

(72) Inventors: Yongcui Li, Beijing (CN); Yan Li, Beijing (CN); Hui Ni, Beijing (CN); Fang Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/918,515

(22) Filed: Jul. 1, 2020

(65) Prior Publication Data

US 2020/0336894 A1 Oct. 22, 2020

Related U.S. Application Data

(63) Continuation of application No. PCT/CN2019/101054, filed on Aug. 16, 2019.

(30) Foreign Application Priority Data

Feb. 19, 2019 (CN) .......................... 201910123302.0

(51) Int. Cl.
*H04W 8/24* (2009.01)
*H04W 64/00* (2009.01)

(52) U.S. Cl.
CPC ............. *H04W 8/24* (2013.01); *H04W 64/00* (2013.01)

(58) Field of Classification Search
CPC ..... H04W 48/16; H04W 64/00; H04W 76/10; H04W 76/12; H04W 76/15; H04W 76/25;
(Continued)

(56) References Cited

U.S. PATENT DOCUMENTS 10,863,390 B2 * 12/2020 Huang-Fu ......... H04W 36/0016
11,399,304 B2 * 7/2022 Park ........................ H04W 8/08
(Continued)

FOREIGN PATENT DOCUMENTS

| CN | 108632953 A | 10/2018 |
| CN | 108738086 A | 11/2018 |

(Continued)

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)," 3GPP Draft; Interim_ Draft 23725-G00+CRS, Feb. 4, 2019, XP051697371, 87 pages.

(Continued)

*Primary Examiner* — Joseph Arevalo
(74) *Attorney, Agent, or Firm* — Conley Rose, P.C.

(57) ABSTRACT

A transmission method and apparatus related to the field of communications technologies and include obtaining, by a session management network element, transport network capability list information, where the transport network capability list information indicates whether a transport network supports high-reliability transmission, and the transport network is a network between an access device and a user plane network element, and managing, by the session management network element, a user plane connection, of a terminal, between the access device and the user plane network element based on the transport network capability list information, where the user plane connection is usable for transmitting a service flow packet of the terminal.

20 Claims, 14 Drawing Sheets

(58) Field of Classification Search
CPC ......... H04W 76/27; H04W 8/08; H04W 8/24; H04W 92/045
USPC ......... 370/328, 236.2, 353, 235, 230, 241.1, 370/310, 338, 247, 389
See application file for complete search history.

(56) References Cited

U.S. PATENT DOCUMENTS

| | | | |
|---|---|---|---|
| 2018/0279397 A1 | 9/2018 | Faccin et al. | |
| 2019/0124572 A1* | 4/2019 | Park | H04W 36/0088 |
| 2019/0274076 A1* | 9/2019 | Kim | H04W 36/00 |
| 2020/0107213 A1* | 4/2020 | Park | H04W 8/06 |
| 2020/0177333 A1* | 6/2020 | Liu | H04W 76/25 |
| 2020/0196375 A1* | 6/2020 | Ryu | H04W 76/34 |
| 2020/0236534 A1* | 7/2020 | Wang | H04W 68/02 |
| 2020/0404718 A1* | 12/2020 | Shekhar | H04L 67/10 |
| 2021/0120620 A1* | 4/2021 | Wang | H04W 76/11 |
| 2021/0282202 A1* | 9/2021 | Vikberg | H04W 76/22 |

FOREIGN PATENT DOCUMENTS

| | | |
|---|---|---|
| CN | 109246778 A | 1/2019 |
| EP | 3585107 A1 | 12/2019 |
| RU | 2677614 C1 | 1/2019 |
| TW | 201907743 A | 2/2019 |
| WO | 2018079947 A1 | 5/2018 |
| WO | 2018145654 A1 | 8/2018 |

OTHER PUBLICATIONS

Nokia, et al., "Key Issue #1—Updates to Solution #7," 3GPP TSG SA WG2 #129BIS, S2-1813131, 3GPP, Nov. 28, 2018, 7 pages.

Nokia, et al., "Solution to Key Issue 2: UPF capabilities advertisement via NRF," 3GPP TSG SA WG2 #129, S2-1810777, 3GPP, Oct. 19, 2018, 3 pages.

Nokia, "Solution to Key Issue #6: NWDAF analytics usage for UPF selection," 3GPP TSG SA WG2 #129, S2-1811120, 3GPP, Oct. 17, 2018, 3 pages.

Huawei, et al., "Update to Solution 15: Support of traffic routing in Backbone UP," 3GPP TSG SA WG2 #129, S2-1811344, 3GPP, Oct. 18, 2018, 9 pages.

CATT, "Higher Layer Multi-Connectivity," 3GPP TSG-RAN WG3 #101bis Chengdu, China, Oct. 8-12, 2018, R3-185556, 5 pages.

3GPP TS 23.502 V15.4.1, "3rd Generation Partnership Project; Technical Specification Group Services and System Aspects; Procedures for the 5G System; Stage 2 (Release 15)," Jan. 2019, 347 pages.

3GPP TS 23.501 V15.4 0, 3rd Generation Partnership Project; Technical Specification Group Services and System Aspects; System Architecture for the 5G System; Stage 2 (Release 15); Dec. 2018, 236 pages.

3GPP TR 23.725 V16.0.0 "3rd Generation Partnership Project; Technical Specification Group Services and System Aspects; Study on enhancement of Ultra-Reliable Low-Latency Communication (URLLC) support in the 5G Core network (5GC) (Release 16);" Dec. 2018, 76 pages.

3GPP TR 38.913 V15.0.0 "3rd Generation Partnership Project; Technical Specification Group Radio Access Network; Study on Scenarios and Requirements for Next Generation Access Technologies; (Release 15);" Jun. 2018, 39 pages.

Huawei, "Solution for KI 2#: Optimizion of handover procedure for URLLC services," 3GPP TSG-SA2 Meeting #127BIS, May 28-Jun. 1, Newport Beach, California USA, S2-185180, 4 pages.

Huawei et al: "Solution for KI 1 #: Redundant Transmission for URLLC service," 3GPP Draft; S2-185534, Jun. 2, 2018, 6 pages.

* cited by examiner

TRANSMISSION METHOD AND APPARATUS

CROSS-REFERENCE TO RELATED APPLICATIONS

This application is a continuation of International Patent Application No. PCT/CN2019/101054 filed on Aug. 16, 2019, which claims priority to Chinese Patent Application No. 201910123302.0 filed on Feb. 19, 2019. The disclosures of the aforementioned applications are hereby incorporated by reference in their entireties.

TECHNICAL FIELD

Embodiments of this application relate to the field of communications technologies, and in particular, to a transmission method and apparatus.

BACKGROUND

For the 5th generation (5G) mobile communications technology, the 3rd Generation Partnership Project (3GPP) organization defines an Ultra-Reliable Low-Latency Communication (URLLC) scenario. Features of the URLLC are high reliability, a low latency, and extremely high availability. The URLLC includes the following scenarios and applications: industrial applications and control, traffic safety and control, remote manufacturing, remote training, remote surgery, and the like. The 3GPP TR38.913 defines indicators on the latency and reliability of the URLLC. Latency: for a URLLC service, an uplink latency target and a downlink latency target of a user plane are 0.5 milliseconds (ms). Reliability: defined as a success rate of transmitting X bytes of data packets within a specified latency. Usually, a reliability requirement for one transmission of the URLLC service is as follows: Within a user plane latency of 1 ms, reliability of transmitting 32 bytes of packets is 1 to $10^{-5}$.

Therefore, how to implement reliable transmission of the URLLC service between a terminal and a 5G core network is an urgent problem to be resolved currently.

SUMMARY

Embodiments of this application provide a transmission method and apparatus, to improve transmission reliability of a service flow packet of a terminal.

To achieve the foregoing objectives, the embodiments of this application provide the following technical solutions.

According to a first aspect, an embodiment of this application provides a transmission method, including obtaining, by a session management network element, transport network capability list information, where the transport network capability list information indicates whether a transport network supports high-reliability transmission, and the transport network is a network between an access device and a user plane network element, and managing, by the session management network element, a user plane connection, of a terminal, between the access device and the user plane network element based on the transport network capability list information, where the user plane connection is usable for transmitting a service flow packet of the terminal.

How to manage the user plane connection, of the terminal, between the access device and the user plane network element is not determined in other approaches. In the transmission method provided in this embodiment of this application, the session management network element obtains the transport network capability list information. The transport network capability list information indicates whether the transport network supports the high-reliability transmission, and the transport network is the network between the access device and the user plane network element, thereby helping the session management network element determine whether the transport network supports the high-reliability transmission and further determine how to manage the user plane connection. In this way, the service flow packet of the terminal can be transmitted reliably.

In a possible implementation, the method provided in this embodiment of this application further includes obtaining, by the session management network element, protocol capability indication information of the access device and protocol capability indication information of the user plane network element, where the protocol capability indication information of the access device indicates whether the access device supports General Packet Radio Service (GPRS) Tunneling Protocol (GTP)-User Plane (GTP-U) protocol enhancement and whether the user plane network element supports the GTP-U protocol enhancement, where managing, by the session management network element, a user plane connection, of a terminal, between the access device and the user plane network element based on the transport network capability list information further includes managing, by the session management network element, the user plane connection based on the protocol capability indication information of the access device, the protocol capability indication information of the user plane network element, and the transport network capability list information. This helps the session management network element manage the user plane connection with reference to the protocol capability indication information of the access device, the protocol capability indication information of the user plane network element, and the transport network capability list information.

In a possible implementation, obtaining, by the session management network element, protocol capability indication information of the user plane network element includes obtaining, by the session management network element, the protocol capability indication information of the user plane network element from the user plane network element, or obtaining, by the session management network element, the protocol capability indication information of the user plane network element from a network repository function NRF.

In a possible implementation, managing, by the session management network element, the user plane connection based on the protocol capability indication information of the access device, the protocol capability indication information of the user plane network element, and the transport network capability list information includes when both the access device and the user plane network element support the GTP-U protocol enhancement, establishing, by the session management network element, between the access device and the user plane network element, at least two N3 tunnels serving as the user plane connection. This helps to transmit the service flow packet using at least two N3 tunnels.

In a possible implementation, managing, by the session management network element, the user plane connection based on the protocol capability indication information of the access device, the protocol capability indication information of the user plane network element, and the transport network capability list information includes when the transport network supports the high-reliability transmission, establishing, by the session management network element, between the access device and the user plane network element, one N3 tunnel serving as the user plane connection.

This helps to transmit the service flow packet using one N3 tunnel as the user plane connection.

In a possible implementation, managing, by the session management network element, the user plane connection based on the protocol capability indication information of the access device, the protocol capability indication information of the user plane network element, and the transport network capability list information includes when the transport network supports the high-reliability transmission and both the access device and the user plane network element support the GTP-U protocol enhancement, determining, by the session management network element based on policy information, to establish, between the access device and the user plane network element, at least two N3 tunnels or one N3 tunnel serving as the user plane connection.

In a possible implementation, the method provided in this embodiment of this application further includes obtaining, by the session management network element, position information of the terminal, and selecting, by the session management network element from the transport network list information based on the position information of the terminal and the transport network capability list information, a user plane network element that supports the high-reliability transmission of the transport network.

In a possible implementation, the method provided in this embodiment of this application further includes obtaining, by the session management network element, protocol capability indication information of the access device, and determining, by the session management network element, the user plane network element based on the protocol capability indication information of the access device and the transport network capability list information.

In a possible implementation, determining, by the session management network element, the user plane network element based on the protocol capability indication information of the access device and the transport network capability list information includes when the transport network capability list information indicates that there is no user plane network element that supports the high-reliability transmission of the transport network and the access device supports GTP-U protocol enhancement, determining, by the session management network element, that a user plane network element that supports the GTP-U protocol enhancement is the user plane network element.

In a possible implementation, the method provided in this embodiment of this application further includes when the transport network capability list information indicates that the transport network does not support the high-reliability transmission and any one or more of the access device and the user plane network element do not support the GTP-U protocol enhancement, sending, by the session management network element to the access device, indication information indicating rejection of establishment of the user plane connection.

In a possible implementation, obtaining, by the session management network element, protocol capability indication information of the access device includes receiving, by the session management network element, the protocol capability indication information of the access device from a mobility management network element, or sending, by the session management network element, a capability obtaining request message to the access device, where the capability obtaining request message requests the protocol capability indication information of the access device, or obtaining, by the session management network element, the protocol capability indication information of the access device from the user plane network element.

In a possible implementation, obtaining, by a session management network element, transport network capability list information includes preconfiguring the transport network capability list information in the session management network element, or obtaining, by the session management network element, the transport network capability list information from the NRF or the user plane network element.

In a possible implementation, when both the access device and the user plane network element support the GTP-U protocol enhancement, the method provided in this embodiment of this application further includes sending, by the session management network element, first indication to the access device and the user plane network element, where the first indication indicates the access device to duplicate, on a GTP-U layer, the service flow packet and indicates the user plane network element to perform, on the GTP-U layer, duplication detection on the service flow packet, or the first indication indicates the user plane network element to duplicate, on the GTP-U layer, the service flow packet and indicates the access device to perform, on the GTP-U layer, duplication detection on the service flow packet.

According to a second aspect, an embodiment of this application provides a transmission apparatus. The transmission apparatus may be a session management network element, or may be a chip or a chip system in the session management network element. The transmission apparatus may include a processing unit and a communications unit. When the transmission apparatus is the session management network element, the processing unit may be a processor and the communications unit may be a communications interface or an interface circuit. The transmission apparatus may further include a storage unit, and the storage unit may be a memory. The storage unit is configured to store an instruction, and the processing unit executes the instruction stored in the storage unit such that the session management network element implements the transmission method described in any one of the first aspect or the possible implementations of the first aspect.

For example, when the transmission apparatus is the session management network element, the communications unit is configured to obtain transport network capability list information. The transport network capability list information indicates whether a transport network supports high-reliability transmission, and the transport network is a network between an access device and a user plane network element. The processing unit is configured to manage a user plane connection, of a terminal, between the access device and the user plane network element based on the transport network capability list information, where the user plane connection is usable for transmitting a service flow packet of the terminal.

In a possible implementation, the communications unit is further configured to obtain protocol capability indication information of the access device and protocol capability indication information of the user plane network element, where the protocol capability indication information of the access device indicates whether the access device supports GTP-U protocol enhancement and whether the user plane network element supports the GTP-U protocol enhancement. The processing unit is further configured to manage the user plane connection based on the protocol capability indication information of the access device, the protocol capability indication information of the user plane network element, and the transport network capability list information.

In a possible implementation, the communications unit is further configured to obtain the protocol capability indication information of the user plane network element from the user plane network element. Alternatively, the communications unit is further configured to obtain the protocol capability indication information of the user plane network element from a network repository function NRF.

In a possible implementation, when both the access device and the user plane network element support the GTP-U protocol enhancement, the processing unit is further configured to establish, between the access device and the user plane network element, at least two N3 tunnels serving as the user plane connection.

In a possible implementation, when the transport network supports the high-reliability transmission, the processing unit is further configured to establish, between the access device and the user plane network element, one N3 tunnel serving as the user plane connection.

In a possible implementation, when the transport network supports the high-reliability transmission and both the access device and the user plane network element support the GTP-U protocol enhancement, the processing unit is further configured to determine, based on policy information, to establish, between the access device and the user plane network element, at least two N3 tunnels or one N3 tunnel serving as the user plane connection.

In a possible implementation, the communications unit is further configured to obtain position information of the terminal. The processing unit is further configured to select, from the transport network list information based on the position information of the terminal and the transport network capability list information, a user plane network element that supports the high-reliability transmission of the transport network.

In a possible implementation, the communications unit is further configured to obtain the protocol capability indication information of the access device. The processing unit is further configured to determine the user plane network element based on the protocol capability indication information of the access device and the transport network capability list information.

In a possible implementation, when the transport network capability list information indicates that there is no user plane network element that supports the high-reliability transmission of the transport network and the access device supports GTP-U protocol enhancement, the processing unit is further configured to determine that a user plane network element that supports the GTP-U protocol enhancement is the user plane network element.

In a possible implementation, when the transport network capability list information indicates that the transport network does not support the high-reliability transmission and any one or more of the access device and the user plane network element do not support the GTP-U protocol enhancement, the communications unit is further configured to send, to the access device, indication information indicating rejection of establishment of the user plane connection.

In a possible implementation, the communications unit is further configured to receive the protocol capability indication information of the access device from a mobility management network element.

In a possible implementation, the communications unit is further configured to send a capability obtaining request message to the access device, where the capability obtaining request message requests the protocol capability indication information of the access device.

In a possible implementation, the communications unit is further configured to obtain the protocol capability indication information of the access device from the user plane network element.

In a possible implementation, the transport network capability list information is preconfigured in the transmission apparatus, or the communications unit is configured to obtain the transport network capability list information from the NRF or the user plane network element.

In a possible implementation, when both the access device and the user plane network element support the GTP-U protocol enhancement, the communications unit is further configured to send first indication to the access device and the user plane network element, where the first indication indicates the access device to duplicate, on a GTP-U layer, the service flow packet and indicates the user plane network element to perform, on the GTP-U layer, duplication detection on the service flow packet, or the first indication indicates the user plane network element to duplicate, on the GTP-U layer, the service flow packet and indicates the access device to perform, on the GTP-U layer, duplication detection on the service flow packet.

For example, when the transmission apparatus is a chip or a chip system in the session management network element, the processing unit may be a processor, and the communications unit may be a communications interface. For example, the communications interface may be an input/output interface, a pin, a circuit, or the like. The processing unit executes the instruction stored in the storage unit such that the session management network element implements the transmission method described in any one of the first aspect or the possible implementations of the first aspect. The storage unit may be a storage unit (for example, a register or a cache) in the chip, or may be a storage unit (for example, a read-only memory or a random access memory) that is in the session management network element and that is outside the chip.

According to on a third aspect, an embodiment of this application provides a computer-readable storage medium. The computer-readable storage medium stores a computer program or an instruction. When the computer program or the instruction is run on a computer, the computer is enabled to perform the transmission method described in any one of the first aspect or the possible implementations of the first aspect.

According to a fourth aspect, an embodiment of this application provides a computer program product including an instruction. When the instruction is run on a computer, the computer is enabled to perform the transmission method described in the first aspect or the possible implementations of the first aspect.

According to a fifth aspect, an embodiment of this application provides a transmission apparatus. The transmission apparatus includes a processor and a storage medium. The storage medium stores an instruction. When the instruction is run by the processor, the transmission method described in the first aspect or the possible implementations of the first aspect is implemented.

According to a sixth aspect, this application provides a chip or a chip system. The chip or the chip system includes at least one processor and a communications interface. The communications interface and the at least one processor are interconnected using a line. The at least one processor is configured to run a computer program or an instruction, to perform the parameter method described in any one of the first aspect or the possible implementations of the first aspect.

According to a seventh aspect, an embodiment of this application provides a transmission method, where the transmission method includes receiving, by an access device, first indication information from a session management network element. The first indication information indicates to manage a user plane connection between the access device and a user plane network element. The user plane connection is usable for transmitting a service flow packet of a terminal.

In a possible implementation, the first indication information indicates to establish, between the access device and the user plane network element, at least two N3 tunnels serving as the user plane connection. This implementation is applicable to a scenario in which the transport network capability list information indicates that the transport network between the access device and the user plane network element supports the high-reliability transmission, and is applicable to a scenario in which both the access device and the user plane network element support GTP-U protocol enhancement.

In a possible implementation, the first indication information indicates to establish, between the access device and the user plane network element, one N3 tunnel serving as the user plane connection. This implementation is applicable to a scenario in which the transport network capability list information indicates that the transport network between the access device and the user plane network element supports the high-reliability transmission.

In a possible implementation, the first indication information indicates indication information that instructs to reject establishment of the user plane connection. This implementation is applicable to a scenario in which the session management network element determines that the transport network capability list information indicates that the transport network does not support the high-reliability transmission and any one or more of the access device and the user plane network element do not support the GTP-U protocol enhancement.

In a possible implementation, the method provided in this embodiment of this application further includes sending, by the access device, protocol capability indication information of the access network device to the session management network element. This implementation may be applicable to a scenario in which the access device actively sends the protocol capability indication information of the access network device to the session management network element. To be specific, after receiving an access stratum (AS) message from the terminal, the access device may actively send the protocol capability indication information of the access network device to the session management network element using an N11 message.

In a possible implementation, sending, by the access device, protocol capability indication information of the access network device to the session management network element further includes receiving, by the access device, a capability obtaining request message, from the session management network element, and in response to the capability obtaining request message, sending, by the access device, the protocol capability indication information of the access network device to the session management network element.

In a possible implementation, the method provided in this embodiment of this application further includes receiving, by the access device, first indication from the session management network element. The first indication indicates the access device to duplicate, on a GTP-U layer, the service flow packet and indicates the user plane network element to perform, on the GTP-U layer, duplication detection on the service flow packet, or the first indication indicates the user plane network element to duplicate, on the GTP-U layer, the service flow packet and indicates the access device to perform, on the GTP-U layer, duplication detection on the service flow packet.

According to an eighth aspect, an embodiment of this application provides a transmission apparatus. The transmission apparatus may be an access device, or may be a chip or a chip system in the access device. The transmission apparatus may include a communications unit. When the transmission apparatus is the access device, the communications unit may be a communications interface or an interface circuit. The transmission apparatus may further include a processing unit and a storage unit, where the processing unit may be a processor. The storage unit may be a memory. The storage unit is configured to store an instruction, and the processing unit executes the instruction stored in the storage unit such that the access device implements the transmission method described in any one of the seventh aspect or the possible implementations of the seventh aspect.

For example, the transmission apparatus may be the access device, and the communications unit is configured to receive first indication information from a session management network element. The first indication information indicates to manage a user plane connection between the access device and a user plane network element. The user plane connection is usable for transmitting a service flow packet of a terminal.

In a possible implementation, the first indication information indicates to establish, between the access device and the user plane network element, at least two N3 tunnels serving as the user plane connection. This implementation is applicable to a scenario in which transport network capability list information indicates that a transport network between the access device and the user plane network element supports high-reliability transmission. This implementation is applicable to a scenario in which both the access device and the user plane network element support GTP-U protocol enhancement.

In a possible implementation, the first indication information indicates to establish, between the access device and the user plane network element, one N3 tunnel serving as the user plane connection. This implementation is applicable to a scenario in which the transport network capability list information indicates that the transport network between the access device and the user plane network element supports the high-reliability transmission.

In a possible implementation, the first indication information indicates indication information that instructs to reject establishment of the user plane connection. This implementation is applicable to a scenario in which the session management network element determines that the transport network capability list information indicates that the transport network does not support the high-reliability transmission and any one or more of the access device and the user plane network element do not support the GTP-U protocol enhancement.

In a possible implementation, the apparatus provided in this embodiment of this application further includes the communications unit, further configured to send protocol capability indication information of the access network device to the session management network element. This implementation may be applicable to a scenario in which the access device actively sends the protocol capability indication information of the access network device to the session management network element. To be specific, after receiving an AS message from the terminal, the access device may actively send the protocol capability indication information of the access network device to the session management network element using an N11 message.

In a possible implementation, the communications unit is further configured to receive a capability obtaining request message from the session management network element, and in response to the capability obtaining request message, send the protocol capability indication information of the access network device to the session management network element.

In a possible implementation, the apparatus provided in this embodiment of this application further includes the access device, receiving first indication from the session management network element. The first indication indicates the access device to duplicate, on a GTP-U layer, the service flow packet and indicates the user plane network element to perform, on the GTP-U layer, duplication detection on the service flow packet, or the first indication indicates the user plane network element to duplicate, on the GTP-U layer, the service flow packet and indicates the access device to perform, on the GTP-U layer, duplication detection on the service flow packet.

For example, the transmission apparatus may be a chip or a chip system in an access device. The processing unit may be a processor, and the communications unit may be a communications interface. For example, the communications interface may be an input/output interface, a pin, a circuit, or the like. The processing unit executes the instruction stored in the storage unit such that the user plane network element implements the transmission method described in any one of the seventh aspect or the possible implementations of the seventh aspect. The storage unit may be a storage unit (for example, a register or a cache) in the chip, or may be a storage unit (for example, a read-only memory or a random access memory) that is in the user plane network element and that is outside the chip.

According to a ninth aspect, an embodiment of this application provides a computer-readable storage medium. The computer-readable storage medium stores a computer program or an instruction. When the computer program or the instruction is run on a computer, the computer is enabled to perform the transmission method described in any one of the seventh aspect or the possible implementations of the seventh aspect.

According to a tenth aspect, an embodiment of this application provides a computer program product including an instruction. When the instruction is run on a computer, the computer is enabled to perform the transmission method described in the seventh aspect or the possible implementations of the seventh aspect.

According to an eleventh aspect, an embodiment of this application provides a transmission apparatus. The transmission apparatus includes a processor and a storage medium. The storage medium stores an instruction. When the instruction is run by the processor, the transmission method described in the seventh aspect or the possible implementations of the seventh aspect is implemented.

According to a twelfth aspect, this application provides a chip or a chip system. The chip or the chip system includes at least one processor and a communications interface. The communications interface and the at least one processor are interconnected using a line. The at least one processor is configured to run a computer program or an instruction, to perform the parameter method described in any one of the seventh aspect or the possible implementations of the seventh aspect.

The communications interface in the chip may be an input/output interface, a pin, a circuit, or the like.

According to a thirteenth aspect, an embodiment of this application provides a communications system, and the communications system includes the transmission apparatus described in the second aspect, and the transmission apparatus described in the eighth aspect. Optionally, the communications system may further include a terminal, a user plane network element, or the like.

For beneficial effects of the second aspect to the thirteenth aspect and the implementations thereof in this application, refer to analysis of beneficial effects in the first aspect and implementations thereof. Details are not described herein again.

DESCRIPTION OF EMBODIMENTS

To clearly describe the technical solutions in embodiments of this application, terms, such as "first" and "second", are used in the embodiments of this application to distinguish between same items or similar items that have a basically same function and usage. For example, a first access device and a second access device are merely intended to distinguish between different access devices, and do not limit a sequence of the first access device and the second access device. A person skilled in the art may understand that the terms such as "first" and "second" do not limit a quantity or an execution sequence, and that the terms such as "first" and "second" do not indicate a definite difference.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" or the like is intended to present a relative concept in a specific manner.

In this application, "at least one" refers to one or more, and "a plurality of" refers to two or more. A term "and/or" describes an association relationship for describing associated objects and represents that three relationships may exist. For example, A and/or B may represent the following three cases: only A exists, both A and B exist, and only B exists. A and B may be in a singular or plural form. The character "/" generally indicates an "or" relationship between the associated objects. "At least one of the following items" or a similar expression indicates any combination of the items, and includes any combination of one or more of the items. For example, at least one of a, b, or c may represent a, b, c, a-b, a-c, b-c, or a-b-c, where a, b, and c may be in a singular or plural form.

The following describes technical solutions of this application with reference to accompanying drawings.

Figure 1:
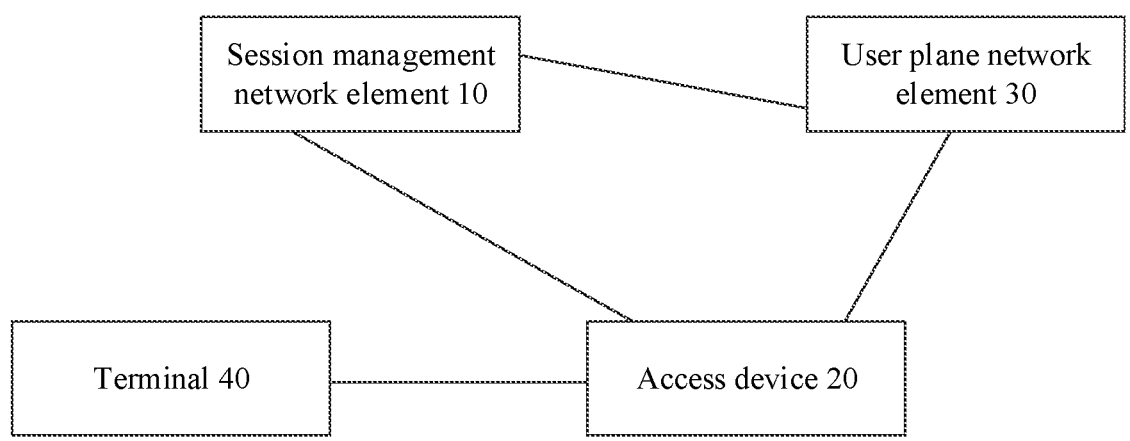
FIG. 1 is a schematic structural diagram of a communication system.

FIG. 1 is a schematic structural diagram of a communications system according to an embodiment of this application. The communications system includes a session management network element 10, at least one access device 20, and at least one user plane network element 30.

The session management network element 10 and the user plane network element 30 are network elements in a core network. The access device 20 is a network element in the access network. The access network may be configured to implement a function related to wireless access.

In an optional implementation, the communications system may further include at least one terminal 40. The at least one terminal 40 is wirelessly connected to the access device 20, to access the core network.

For the communications system, for specific steps performed by the user plane network element 30, the session management network element 10, the at least one terminal 40, and the at least one access device 20, refer to descriptions in the following embodiments. Details are not described herein again. It should be understood that the communications system and the transmission method in the embodiments of this application may be mutually referenced.

User plane data of the at least one terminal 40 is sent to an access device 20 accessed by the at least one terminal 40, then the user plane data is transmitted to the user plane network element 30 through a user plane connection between the access device 20 and the user plane network element 30, and finally, the user plane data is sent by the user plane network element 30 to a network. Certainly, the user plane network element 30 may further obtain, from the network, user plane data sent to the terminal, then send the user plane data of the terminal to the access device 20 through the user plane connection between the user plane network element 30 and the access device 20, and finally, the access device 20 transmits the user plane data to the target terminal.

The user plane data in the embodiments of this application may also be referred to as a service flow packet.

For example, the access device 20 in this embodiment of this application may be an access device in a 4th generation (4G) network, for example, an Evolved Node B (eNB). In this case, the core network may be a 4G core network (for example, an Evolved Packet Core (EPC).

In another example, the access device 20 in this embodiment of this application may be an access device in a 5G network, for example, a next generation NodeB (gNB). In this case, the core network may be a 5G core (5GC).

For example, the access device is a device that provides wireless access for the terminal. It may be a radio access network (for example, a next generation radio access network (NG RAN)) device, a wired access network/fixed network access (W-5GAN) device, for example, an access gateway function (AGF) or a network gateway control device (BNG), a WI-FI access point (AP), or a Worldwide Interoperability for Microwave Access (WIMAX) base station (BS).

In an optional implementation, the communications system may further include a mobility management network element, a policy network element, or the like. In the 4G network, the session management network element 10 may be a mobility management entity (MME). The user plane network element may be a serving gateway (SGW) and/or a PDN gateway (PGW). The policy network element may be a policy and charging rules function unit (PCRF). That is, in 4G, the MME has both a session management function and a mobility management function.

Figure 2:
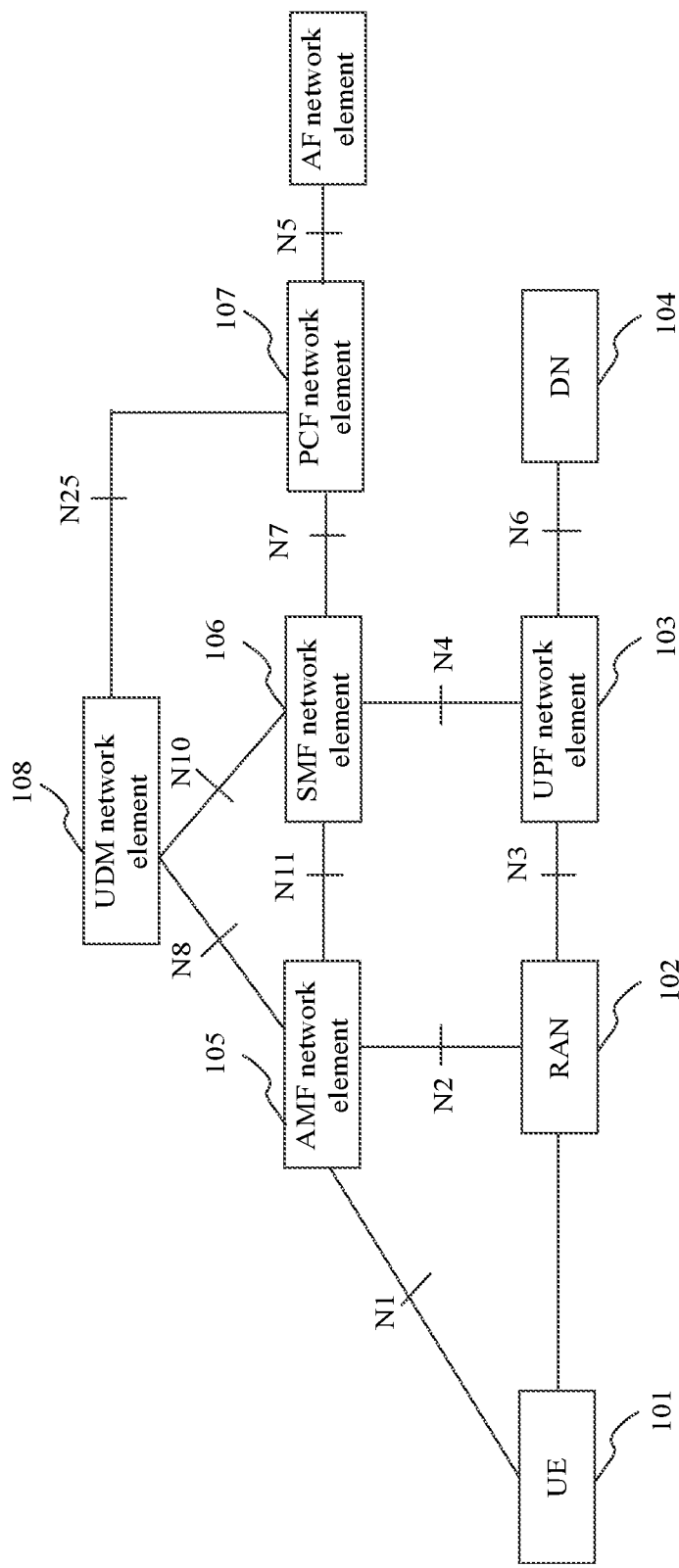
FIG. 2 is a 5G network architecture according to an embodiment of this application.

In the 5G network, as shown in FIG. 2, the session management network element 10 may be a session management function (SMF) network element 106. The user plane network element 30 may be a user plane function (UPF) network element 103. The access device may be a radio access device (RAN) 102. The mobility management network element may be an access and mobility management function (AMF) network element 105, and the policy network element may be a policy control function (PCF) network element 107.

In addition, as shown in FIG. 2, the 5G network architecture may further include an application function (AF), a unified data management (UDM) network element 108, and a data network (DN) 104. In addition, in a possible implementation, the 5G network architecture may further include a network repository function (NRF) network element. The NRF network element is not shown in the architectural diagram, and the NRF network element is mainly used for network element discovery.

The terminal communicates with the AMF network element through a next generation network (N1) interface (N1). The access device communicates with the AMF network element through an N2 interface (N2). The access device communicates with the UPF network element through an N3 interface (N3). The UPF network element communicates with the DN through an N6 interface (N6). Any two UPF network elements communicate with each other through an N9 interface (N9). The UPF network element communicates with the SMF network element through an N4 interface (N4). The AMF network element communicates with the SMF network element through an N11 interface (N11). The AMF network element communicates with the UDM network element through an N8 interface (N8). The SMF network element communicates with the PCF network element through an N7 interface (N7). The SMF network element communicates with the UDM network element through an N10 interface (N10).

It should be understood that, in the network architecture shown in FIG. 2, the control plane network elements may alternatively exchange with each other using a service-based interface. For example, the AMF network element, the SMF network element, the UDM network element, or the PCF network element exchange with each other using a service-based interface. For example, an external service-based interface provided by the AMF network element may be Namf. An external service-based interface provided by the SMF network element may be Nsmf. An external service-based interface provided by the UDM network element may be Nudm. An external service interface provided by the PCF network element may be Npcf. It should be understood that, for related descriptions of names of various service-based interfaces in FIG. 3, refer to a 5G system architecture diagram in the 23501 standard. Details are not described herein.

It should be noted that FIG. 2 merely gives, for example, a UPF network element and an SMF network element. Certainly, the figure may include a plurality of UPF network elements and a plurality of SMF network elements, for example, include an SMF network element 1 and an SMF network element 2. This is not limited in this embodiment of this application.

It should be noted that the access device, the AMF network element, the SMF network element, the UDM network element, the UPF network element, the PCF network element, and the like in FIG. 2 are merely names, and the names do not constitute any limitation to the device. In a 5G network and another future network, network elements corresponding to the access device, the AMF network element, the SMF network element, the UDM network element, the UPF network element, and the PCF network element may have other names. This is not limited in this embodiment of this application. For example, the UDM network element may be replaced with a home subscriber server (HSS), a user subscription database (USD), a database entity, or the like. This is uniformly described herein, and details are not described below again.

The RAN 102 is a device providing wireless access for the terminal, including but not limited to an eNodeB, a WI-FI AP, a WIMAX BS, or the like.

The AMF network element 105 is mainly responsible for mobility management in a mobile network, such as user position update, registration of a user with a network, and user switching.

The SMF network element 106 is mainly responsible for session management in the mobile network, such as session establishment, modification, and release. For example, specific functions are allocating an Internet Protocol (IP) address to a user, and selecting a UPF that provides a packet forwarding function.

The PCF network element 107 is responsible for providing a policy to the AMF network element 105 and the SMF network element 106, such as quality of service (QoS) policy and a slice selection policy.

The UDM network element 108 is configured to store user data such as subscription information and authentication/authorization information.

The UPF is mainly responsible for processing a packet of the user, such as forwarding and charging.

The DN is an operator network that provides a data transmission service for a user, such as an IP multimedia service (IMS), or the Internet.

The terminal accesses the data network (DN) by establishing a session (PDU session) that passes through a user equipment (UE), the RAN, the UPF network element, and the DN.

Figure 3:
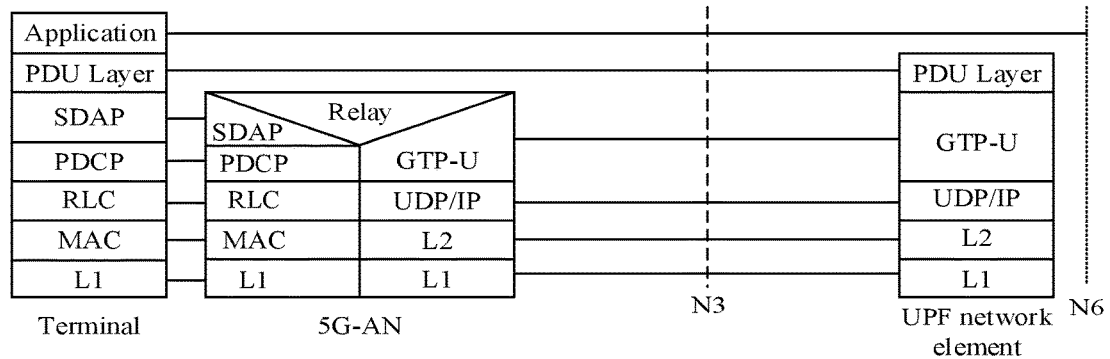
FIG. 3 is an architectural diagram of an end-to-end user plane protocol stack according to an embodiment of this application.

As shown in FIG. 3, FIG. 3 is an architectural diagram of a user plane protocol stack between a terminal and a user plane network element according to an embodiment of this application. As shown in FIG. 3, for a terminal, the terminal may sequentially include the following protocol layers from top to bottom: an application layer, a PDU layer, a Service Data Adaptation Protocol (SDAP) layer, a Packet Data Convergence Protocol (PDCP) layer, a radio link control (RLC) layer, a media access control (MAC) layer, and an L1 layer. For an access device, the access device may include a first protocol stack corresponding to the terminal and a second protocol stack corresponding to a UPF network element. The first protocol stack sequentially includes the following from top to bottom: an SDAP layer corresponding to the SDAP layer of the terminal, a PDCP layer corresponding to the PDCP layer of the terminal, an RLC layer corresponding to the RLC layer of the terminal, a MAC layer corresponding to the MAC layer of the terminal, and an L1 layer corresponding to the L1 layer of the terminal. The second protocol stack includes: a GTP-U layer, a UDP layer/IP layer, an L2 layer (layer 2), and an L1 layer (layer 1). A protocol stack of the UPF network element successively includes from top to bottom: a PDU layer corresponding to the terminal, a GTP-U layer corresponding to the RAN, a UDP/IP layer corresponding to the RAN, and an L2 layer and an L1 layer that correspond to the RAN.

The GTP-U layer is a tunnel encapsulation protocol based on a UDP layer/IP layer, and is usable for transferring a service flow packet between a radio access network (for example, an AN) and a core network (for example, a UPF network element).

A service flow packet is transmitted between the RAN and the UPF network element by establishing a tunnel. The tunnel is referred to as an N3 tunnel. The RAN and the UPF network element are connected using a plurality of switches or a plurality of routers. The switches/routers are configured to forward packets between the RAN and the UPF network element.

For a service (for example, a URLLC service) having a requirement for high-reliability transmission, there are two manners that may be used to implement high-reliability transmission of user plane data.

Figure 4:
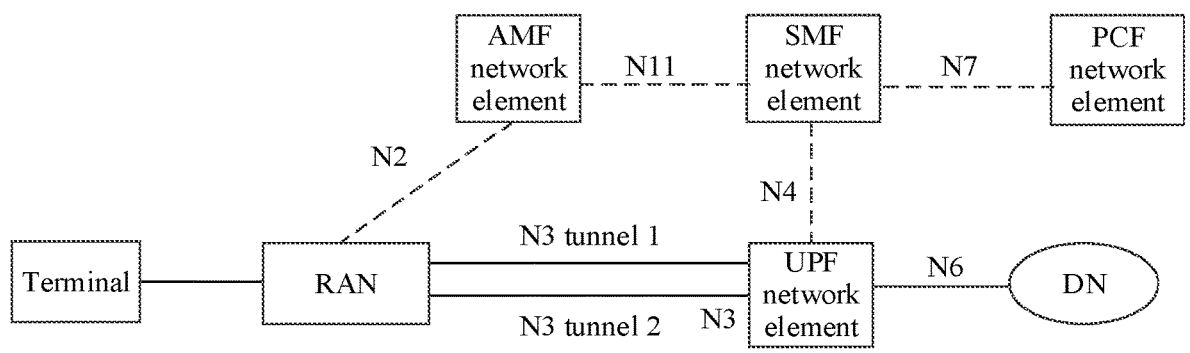
FIG. 4 is a schematic diagram of a user plane enhanced protocol stack according to an embodiment of this application to achieve high-reliability transmission.

In a first manner, redundant transmission is performed on the GTP-U layer. As shown in FIG. 4, when both an access device accessed by the terminal and a user plane network element support GTP-U protocol enhancement, redundant N3 tunnels may be established between a RAN accessed by the terminal and a UPF. That is, at least two N3 tunnels are established between a same RAN and a same UPF, for example, an N3 tunnel 1 and an N3 tunnel 2 shown in FIG. 4. In an uplink direction, to be specific, a process in which the terminal sends user plane data to a core network, when receiving uplink user plane data from the terminal, the RAN may duplicate the uplink user plane data on the GTP-U layer to obtain uplink user plane data 1 and uplink user plane data 2. The uplink user plane data 1 and the uplink user plane data 2 are same user plane data obtained by duplicating the uplink user plane data. The RAN transmits the uplink user plane data 1 to the UPF network element using the N3 tunnel 1, and transmits the uplink user plane data 2 to the UPF network element using the N3 tunnel 2. After receiving the uplink user plane data 1 and the uplink user plane data 2, the UPF network element may perform duplication detection on the uplink user plane data 1 and the uplink user plane data 2 on the GTP-U layer. Therefore, high-reliability transmission of the user plane data is implemented. In a downlink direction (to be specific, a process in which the core network sends user plane data to the terminal), the UPF network element duplicates downlink user plane data on the GTP-U layer, and separately transmits the duplicated downlink user plane data to the RAN using the N3 tunnel 1 and the N3 tunnel 2 that are independent of each other. The RAN eliminates a duplicated downlink user plane data from the downlink user plane data from the N3 tunnel 1 and the N3 tunnel 2. It should be understood that the N3 tunnel 1 and the N3 tunnel 2 are different paths for transmitting a service flow packet, that is, the uplink user plane data 1 and the uplink user plane data 2 are transmitted to the UPF network element through different switches/routers.

It can be known from the above descriptions that, the first manner requires that the RAN and the UPF network element duplicate the user plane data on the GTP-U protocol layer and eliminate a duplicated user plane data on the GTP-U protocol layer. That is, the first manner requires that the RAN and the UPF network element support the GTP-U enhanced protocol.

Figure 5:
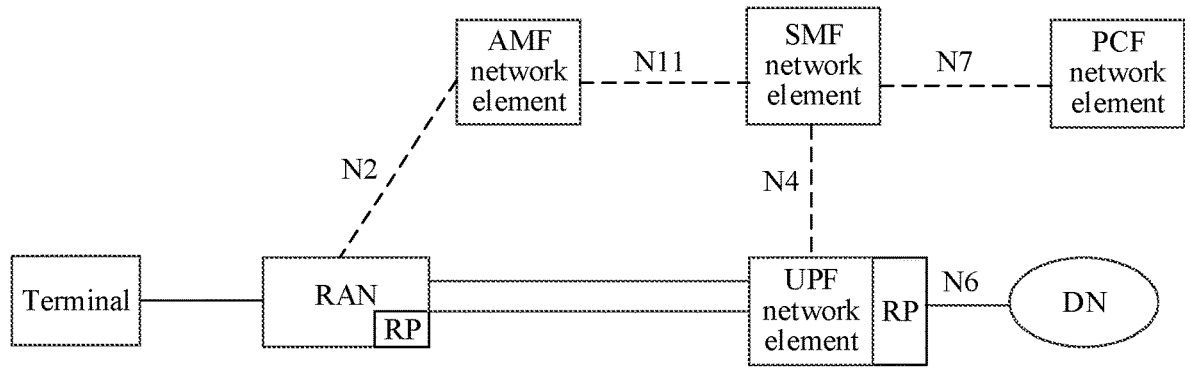
FIG. 5 is a schematic diagram of a transport layer according to an embodiment of this application, to achieve high-reliability transmission.

In a second manner, high-reliability transmission is implemented using transport layer redundant transmission. As shown in FIG. 5, the RAN and the UPF network element support a duplication protocol (replication protocol (RP)) function, that is, the RAN and the UPF network element have a duplication function. It should be noted that the duplication function may be a separate entity independent of the RAN and the UPF network element. For example, the RP may be located on a switch or a router connected to the RAN or the UPF network element. Packets are duplicated on the transport layer and duplicated packets are eliminated on the transport layer using the duplication function, to implement redundant transmission of the user plane data.

For example, user plane transmission is described using an example in which the RP function is located on the RAN and the UPF network element. In the uplink direction, uplink user plane data received from the terminal is duplicated on the transport layer using the RP function of the RAN, to obtain uplink user plane data 1 and uplink user plane data 2. Then, the RAN separately transmits the uplink user plane data 1 and the uplink user plane data 2 to the UPF network element through independent transmission paths. To be specific, the RAN transmits the uplink user plane data 1 to the UPF through a transmission path 1, and transmits the uplink user plane data 2 to the UPF network element through a transmission path 2. After receiving the uplink user plane data 1 and the uplink user plane data 2, the UPF network element eliminates duplicated user plane data from the uplink user plane data 1 and the uplink user plane data 2. In the downlink direction, received downlink user plane data is duplicated on the transport layer using the RP function of the UPF, to obtain downlink user plane data 1 and downlink user plane data 2. Then, the UPF network element sends the downlink user plane data 1 and the downlink user plane data 2 to the RAN using independent transmission paths. The RAN eliminates duplicated user plane data from the received downlink user plane data 1 and the received downlink user plane data 2. The transport layer is a layer 2 protocol layer in a protocol stack, and may be a MAC layer. The transmission paths refer to paths formed by connecting at least one routers or at least one switches between the RAN and the UPF network element, and the transmission path 1 and the transmission path 2 are independent of each other.

It can be known from the foregoing descriptions that, the second manner requires that the user plane data be duplicated on the transport layer and the duplicated user plane data be eliminated on the transport layer using the RP function. That is, the second manner requires that the transport network between the RAN and the UPF network element support the high-reliability transmission. If the RAN or the UPF network element transmits the user plane data using a solution shown in FIG. 4, the RAN or the UPF network element does not support the GTP-U enhanced protocol. Alternatively, if the RAN or the UPF network element transmits the user plane data using a solution shown in FIG. 5, the transport network does not support the high-reliability transmission. Therefore, the high-reliability transmission manners are invalid solutions, to be specific, transmission of the user plane data is not ensured highly reliably.

For the foregoing two high-reliability transmission solutions, currently, there is no solution to describe how to select a proper high-reliability transmission solution for a URLLC service. If the SMF network element transmits the user plane data by randomly selecting one of the high-reliability transmission solutions, a phenomenon that high-reliability transmission of a service cannot be ensured may occur, and consequently, service experience of a user is degraded. For example, the SMF network element transmits the user plane data using the high-reliability solution shown in FIG. 4, but the RAN or the UPF network element does not support the GTP-U enhanced protocol, or the SMF network element transmits the user plane data using the high-reliability solution shown in FIG. 5, but the transport network does not support the high-reliability transmission. In this case, the high-reliability solution selected by the SMF network element cannot be normally performed. That is, the high-reliability solution is an invalid solution, and therefore, user plane data transmission of the URLLC service is not ensured highly reliably.

Therefore, an embodiment of this application provides a transmission method, to implement user plane connection management between the access device and the user plane network element. A session management network element obtains transport network capability list information, and determines, based on the transport network capability list information, whether the transport network supports the high-reliability transmission, to manage a user plane connection between the access device and the user plane network element. For example, if the transport network supports the high-reliability transmission, a solution shown in FIG. 5 is selected to transmit user plane data.

Figure 6:
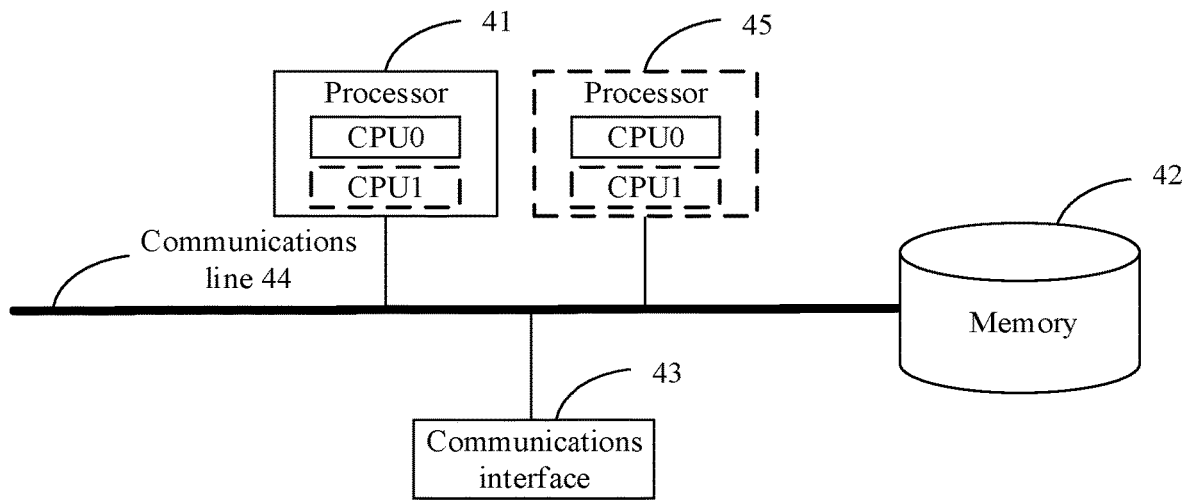
FIG. 6 is a schematic diagram of a hardware structure of a communications device according to an embodiment of this application.

FIG. 6 is a schematic diagram of a hardware structure of a communications device according to an embodiment of this application. For hardware structures of a terminal, the session management network element, and a user plane network element in this embodiment of this application, refer to the schematic diagram of the hardware structure of the communications device shown in FIG. 6. The communications device includes a processor 41, a communications line 44, and at least one communications interface (where FIG. 6 is described merely using an example in which the communications device includes a communications interface 43).

The processor 41 may be a general-purpose central processing unit (CPU), a microprocessor, an application-specific integrated circuit (ASIC), or one or more integrated circuits configured to control program execution of the solutions in this application.

The communications line 44 may include a channel that transmits information between the foregoing components.

The communications interface 43, which is used on any apparatus such as a transceiver, is configured to communicate with another device or another communications network, such as the Ethernet, a radio access network (RAN), or a wireless local area network (WLAN).

Optionally, the communications device may further include a memory 42.

The memory 42 may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc (CD) ROM (CD-ROM) or another compact disc storage, an optical disc storage (including a CD, a laser disc, an optical disc, a digital versatile disc (DVD), a BLU-RAY DISC, or the like), a magnetic disk storage medium, another magnetic storage device, or any other medium that can be configured to carry or store expected program code in a form of an instruction or a data structure and that can be accessed by a computer. However, the memory 42 is not limited thereto. The memory may exist independently and is connected to the processor using the communications line 44. The memory may alternatively be integrated with the processor.

The memory 42 is configured to store a computer-executable instruction for executing the solutions of this application, and the processor 41 controls execution of the computer-executable instruction. The processor 41 is configured to execute the computer-executable instruction stored in the memory 42, to implement a transmission method provided in the following embodiments of this application.

Optionally, the computer-executable instruction in this embodiment of this application may also be referred to as application program code. This is not limited in this embodiment of the application.

In specific implementation, in an embodiment, the processor 41 may include one or more CPUs, such as a CPU 0 and a CPU 1 in FIG. 6.

In specific implementation, in an embodiment, the communications device may include a plurality of processors, such as the processor 41 and a processor 45 in FIG. 6. Each of the processors may be a single-core (single-CPU) processor, or may be a multi-core (multi-CPU) processor. The processor herein may be one or more devices, circuits, and/or processing cores configured to process data (for example, a computer program instruction).

A transmission method provided in the embodiments of this application is described below in detail with reference to FIG. 1 to FIG. 6.

It should be noted that names of messages between network elements in the following embodiment of this application, names of parameters in the messages, or the like are merely examples, and there may be other names during specific implementation. This is not limited in this embodiment of this application.

Figure 7:
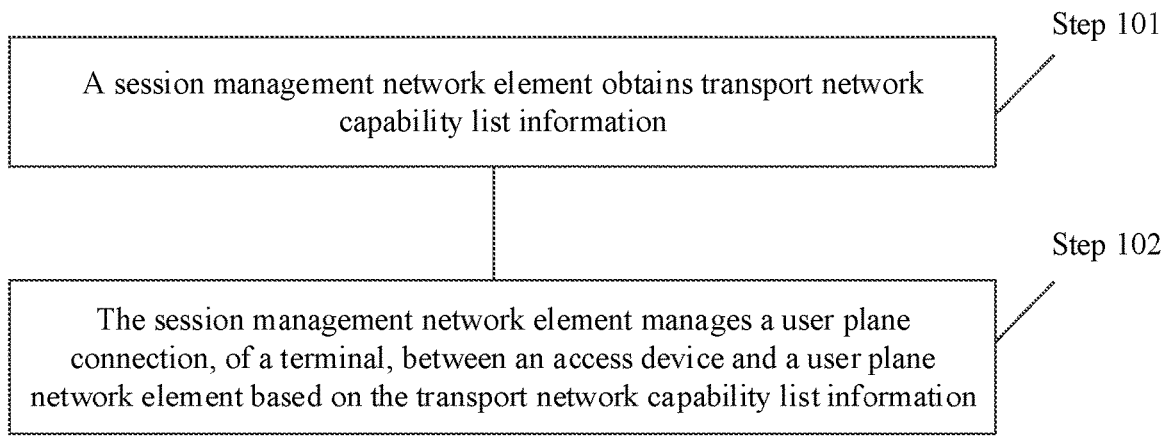
FIG. 7 is a first schematic flowchart of a transmission method according to an embodiment of this application.

As shown in FIG. 7, an embodiment of this application provides a transmission method. The transmission method includes the following steps.

Step 101: A session management network element obtains transport network capability list information. The transport network capability list information indicates whether a transport network supports high-reliability transmission. The transport network is a network between an access device and a user plane network element.

For example, the transport network may be a network between each access network device in at least one access device and at least one user plane network element. Different access devices may correspond to a same user plane network element, that is, one user plane network element may be connected to a plurality of access devices. One access device may also access a plurality of user plane network elements. The at least one access device and the at least one user plane network element are both located in a service area of the session management network element.

For example, the transport network may include a network between an access device 1 and a user plane network element 1, a network between the access device 1 and a user plane network element 2, and a network between an access device 2 and the user plane network element 1, as shown in Table 1 below.

TABLE 1

| | Transport network |
|---|---|
| Transport network 1 | Transport network between the access device 1 and the user plane network element 1 |
| Transport network 2 | Transport network between the access device 1 and the user plane network element 2 |
| Transport network 3 | Transport network between the access device 2 and the user plane network element 1 |

Step 102: The session management network element manages a user plane connection, of a terminal, between the access device and the user plane network element based on the transport network capability list information. The user plane connection is usable for transmitting a service flow packet of the terminal.

The management of a user plane connection in this embodiment of this application may refer to establishment of a user plane connection or rejection of establishment of a user plane connection.

How to manage the user plane connection, of the terminal, between the access device and the user plane network element is not determined in the other approaches. In the transmission method provided in this embodiment of this application, the session management network element obtains the transport network capability list information. The transport network capability list information indicates whether the transport network supports the high-reliability transmission, and the transport network is the network between the access device and the user plane network element, thereby helping the session management network element determine whether the transport network supports the high-reliability transmission and determine how to manage the user plane connection. In this way, the service flow packet of the terminal can be transmitted reliably.

Figure 8:
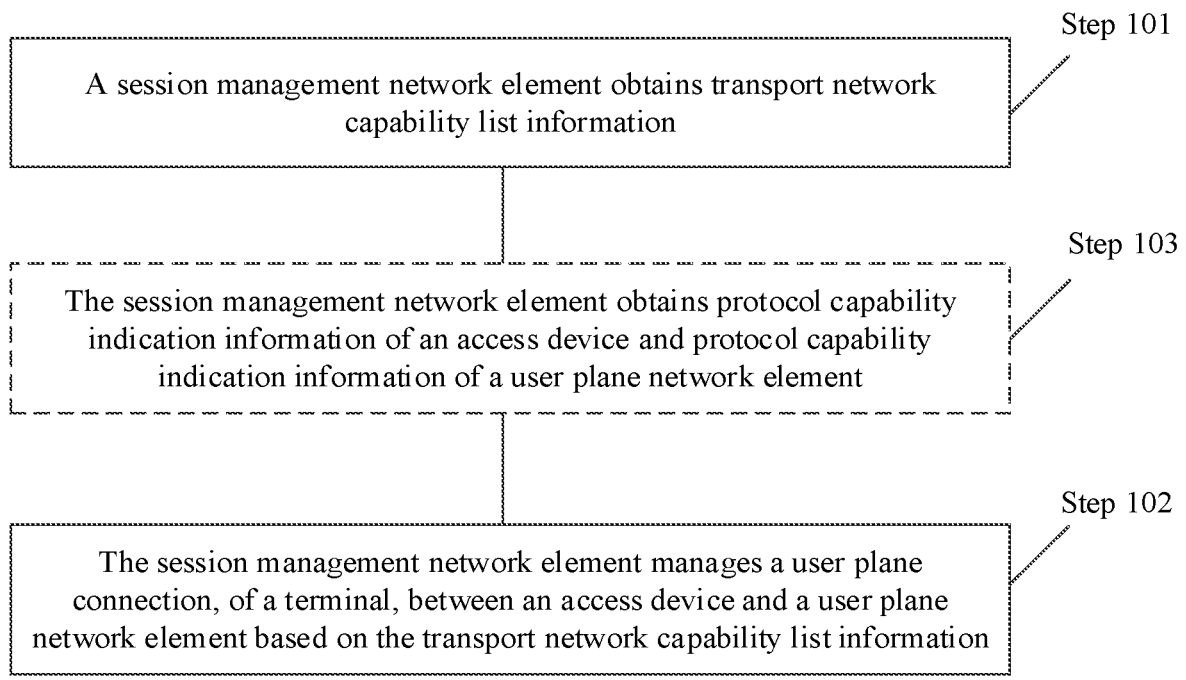
FIG. 8 is a second schematic flowchart of a transmission method according to an embodiment of this application.

In an example, when the transport network capability list information indicates whether the transport network between the access device (for example, the access device 1 shown in Table 1) accessed by the terminal and the user plane network element (for example, the user plane network element 1) selected by the session management network element for the terminal in a session management process supports the high-reliability transmission, in a possible embodiment, as shown in FIG. 8, before step 102, the method provided in this embodiment of this application further includes the following steps.

Step 103: The session management network element obtains protocol capability indication information of the access device and protocol capability indication information of the user plane network element. The protocol capability indication information of the access device indicates whether the access device supports GTP-U protocol enhancement, and the protocol capability indication information of the user plane network element indicates whether the user plane network element supports the GTP-U protocol enhancement.

It should be understood that, on one hand, regardless of whether the transport network between the access device accessed by the terminal and the user plane network element supports the high-reliability transmission, the session management network element may perform step 103. On the other hand, in a possible embodiment, if the session management network element determines that the transport network capability list information indicates that the transport network between the access device accessed by the terminal and the user plane network element selected by the session management network element for the terminal in the session management process does not support the high-reliability transmission, the session management network element may perform step 103. It should be noted that, when the session management network element does not need to determine whether the transport network supports the high-reliability transmission, step 101 and step 103 may be performed simultaneously, or step 103 is performed before step 101. That is, a sequence of step 101 and step 103 is not limited in this embodiment of this application.

For example, in this embodiment of this application, manners in which the session management network element obtains the protocol capability indication information of the access device may include the following.

Manner 1: The session management network element receives the protocol capability indication information of the access device from a mobility management network element.

Example (1)

The access device actively performs sending.

Figure 9:
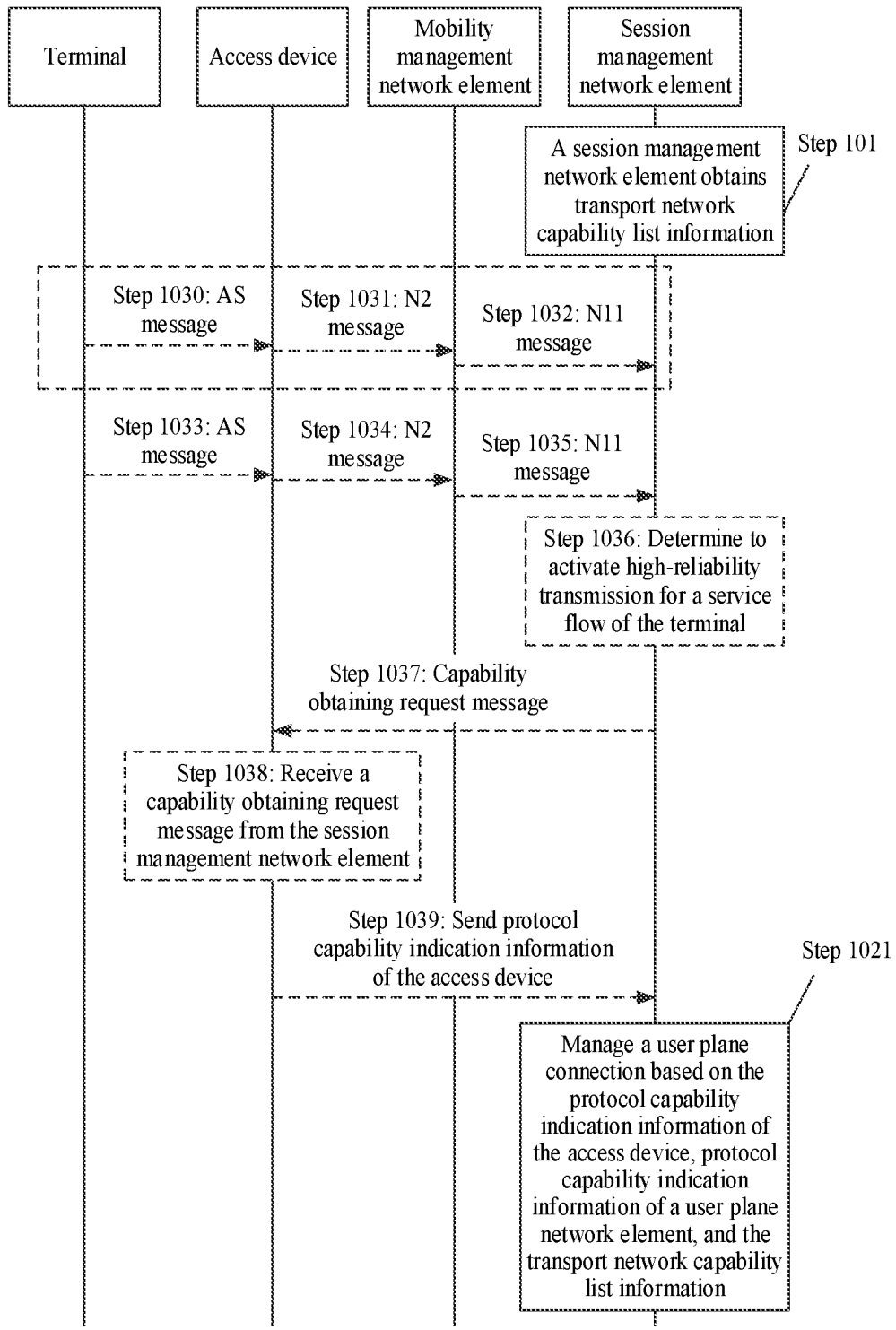
FIG. 9 is a third schematic flowchart of a transmission method according to an embodiment of this application.

For example, as shown in FIG. 9, in a first possible implementation, step 103 may be implemented in the following manner.

Step 1030: The terminal sends an AS message to the access device, so that the access device receives the AS message from the terminal. The AS message carries a non-access stratum (NAS) message. The NAS message includes a session identifier, a data network name (DNN), a Single Network Slice Selection Assistance Information (S-NSSAI), and a session establishment request message. Further, when a session establishment procedure needs to be performed, the terminal may perform step 1030.

Step 1031: The access device sends an N2 message to the mobility management network element. The N2 message carries the protocol capability indication information of the access device, the NAS message in step 1030, position information of the terminal, or the like. The position information of the terminal may be represented by an identifier of the access device.

Step 1032: The mobility management network element sends an N11 message to the session management network element. The N11 message carries the protocol capability indication information of the access device and the position information of the terminal.

Therefore, the session management network element may obtain the protocol capability indication information of the access device from the mobility management network element.

It should be noted that this embodiment of this application is further applicable to a session modification procedure, that is, in the session modification procedure, the session management network element obtains the protocol capability indication information of the access device. When this embodiment of this application is applicable to the session modification procedure, the session establishment request message in the NAS message in step 1031 may be replaced with a session modification request message.

Example (2)

The session management network element triggers a protocol capability obtaining process of the access device.

As shown in FIG. 9, in a second possible implementation, step 103 may be implemented in the following manner.

Step 1033 to step 1035 are similar to step 1030 to step 1032. For details, refer to the descriptions in step 1030 to step 1032. A difference lies in: Step 1034 and step 1035 do not carry the protocol capability indication information of the access device.

Step 1036: The session management network element determines, based on the received N11 message, or a local policy, or according to Policy and Charging Control (PCC) rules from the PCF, to activate the high-reliability transmission for a service flow of the terminal.

Step 1037: The session management network element sends a capability obtaining request message to the access device. The capability obtaining request message requests the protocol capability indication information of the access device.

Step 1038: The access device receives the capability obtaining request message from the session management network element by using the mobility management network element.

Step 1039: The access device sends the protocol capability indication information of the access device to the session management network element.

Further, in response to the capability obtaining request message, the access device sends a capability obtaining response message to the session management network element using the mobility management network element. The capability obtaining response message carries the protocol capability indication information of the access device.

Therefore, the session management network element may obtain the protocol capability indication information of the access device from the access device.

It should be understood that the description in Manner 2 is made using the session establishment procedure as an example. When this embodiment of this application is applicable to the session modification procedure, the session establishment request message in the NAS message in step 1033 may be replaced with a session modification request message.

A difference between Example (1) and Example (2) lies in: In Example (1), the access device actively reports the protocol capability indication information, and in Example (2), the access device reports the protocol capability indication information only when the session management network element determines that the reliable transmission needs to be activated for a service flow packet. The protocol capability indication information of the access device actively reported by the access device in Example (1) may be useless information for the session management network element. For example, when the session management network element determines to implement the high-reliability transmission of the service flow packet using the transport layer, that is, when the session management network element does not need to activate N3 redundant tunnel transmission, the session management network element may not need to obtain the protocol capability indication information of the access device.

Example (3)

The mobility management network element obtains the protocol capability indication information of the access device in a process of establishing an N2 device connection, and sends the protocol capability indication information of the access device to the session management network element.

Figure 10:
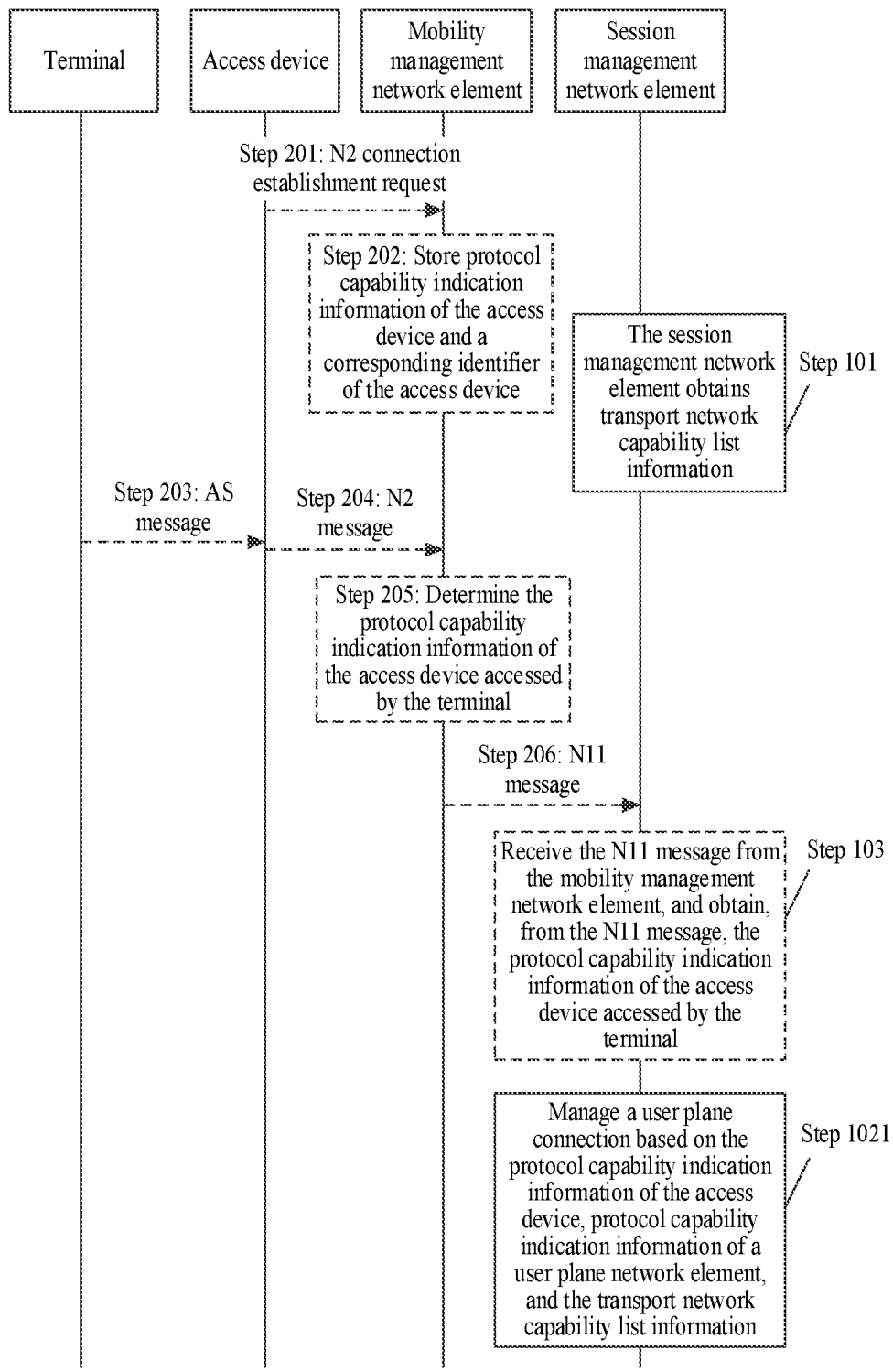
FIG. 10 is a fourth schematic flowchart of a transmission method according to an embodiment of this application.

In Example (3), as shown in FIG. 10, obtaining, by the session management network element, the protocol capability indication information of the access device includes two parts. In a first part, the mobility management network element obtains the protocol capability indication information of the access device. In a second part, the mobility management network element sends the protocol capability indication information of the access device to the session management network element.

For the first part, as shown in FIG. 10, before step 103, the method provided in this embodiment of this application further includes the following steps.

Step 201: The access device sends an N2 connection establishment request to the mobility management network element, so that the mobility management network element receives the N2 connection establishment request from the access device. The N2 connection establishment request carries the protocol capability indication information of the access device.

Step 202: The mobility management network element receives the protocol capability indication information of the access device, and stores the protocol capability indication information of the access device and a corresponding identifier of the access device. For example, the mobility management network element stores an identifier of the access device 1 and stores that the access device 1 supports the GTP-U protocol enhancement.

For the second part, a session establishment procedure is used as an example. As shown in FIG. 10, the method further includes the following steps.

Step 203: The terminal sends an AS message to the access device. The AS message carries a NAS message. The NAS message carries a session identifier, a session establishment request message, a DNN, and an S-NSSAI.

Step 204: The access device sends an N2 message to the mobility management network element. The N2 message carries the NAS message in step 203), and position information of the terminal, or the like.

Step 205: The mobility management network element determines, based on the N2 message, the access device identifier, and determines, based on a stored correspondence between the protocol capability indication information of the access device and an identifier of the access device, the protocol capability indication information of the access device accessed by the terminal.

Step 206: The mobility management network element sends an N11 message to the session management network element, where the N11 message carries the protocol capability indication information of the access device in step 205), the NAS message, or the like.

Therefore, step 103 in this embodiment of this application may be implemented in the following manner: The session management network element receives the N11 message from the mobility management network element, and obtains, from the N11 message, the protocol capability indication information of the access device accessed by the terminal.

Figure 11A:
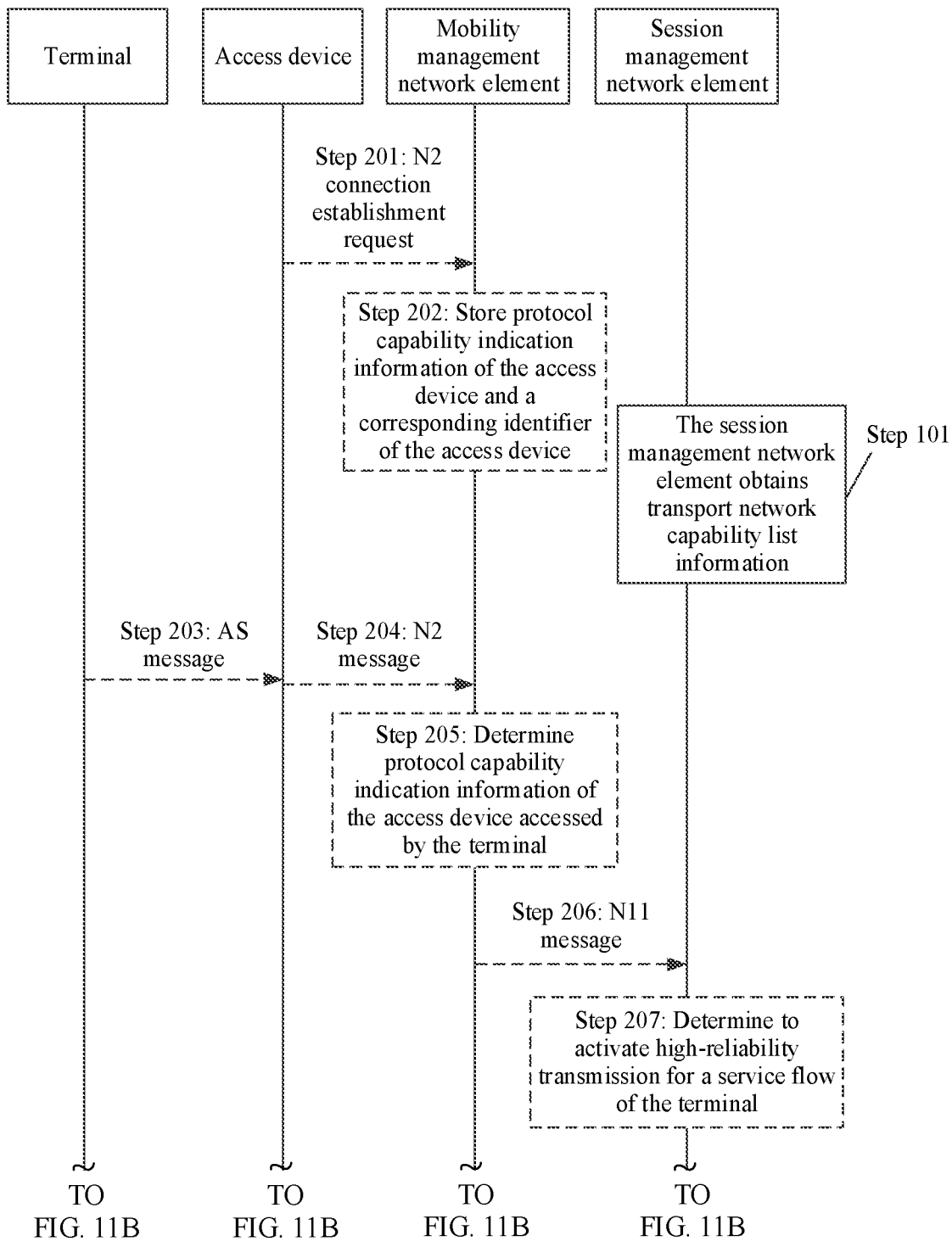
FIG. 11A and FIG. 11B are a fifth schematic flowchart of a transmission method according to an embodiment of this application.
Figure 11B:
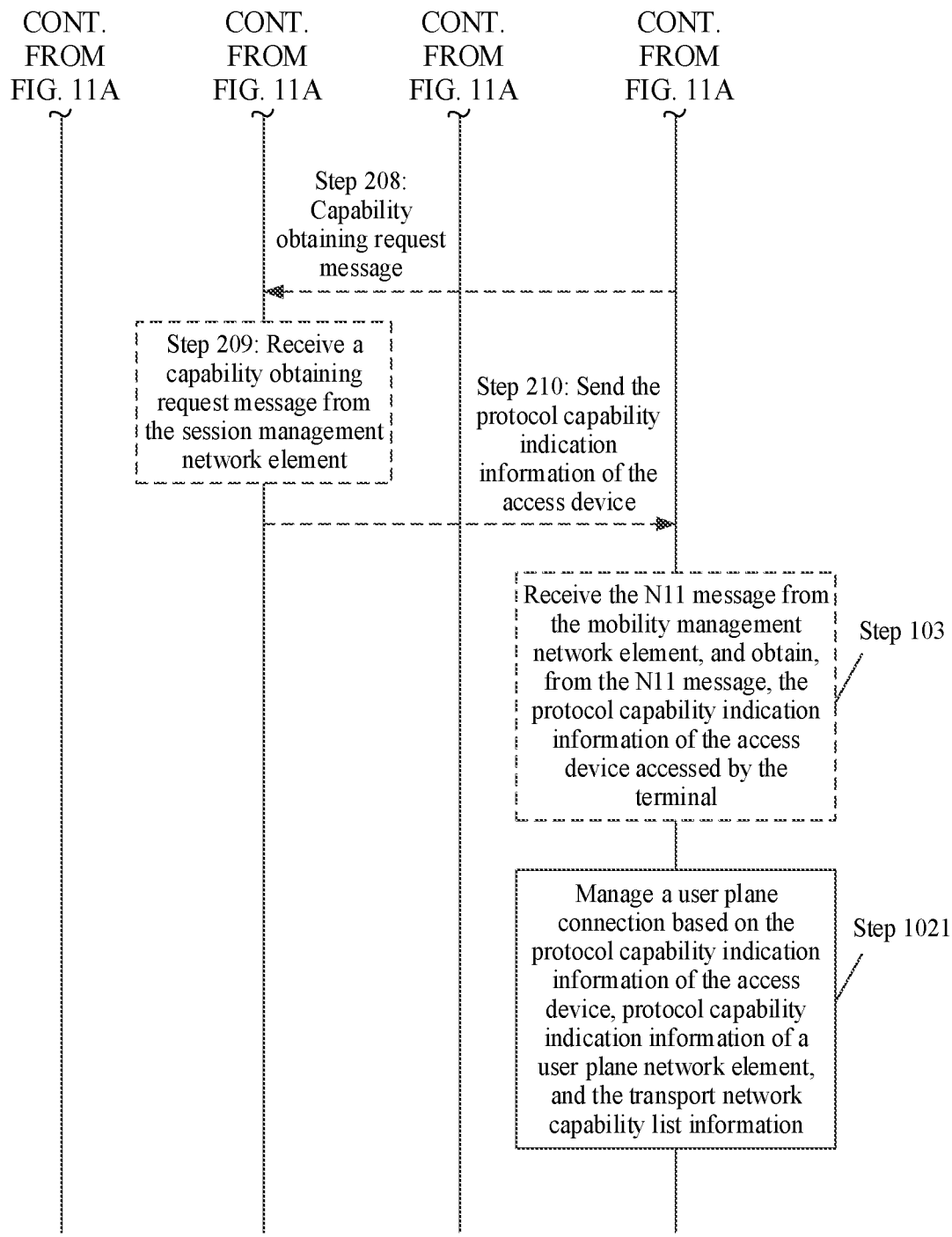

It should be noted that, similar to Example (2), the mobility management network element may also send the protocol capability indication information of the access device to the session management network element after receiving a protocol capability obtaining request sent by the session management network element. As shown in FIG. 11A and FIG. 11B, specific modifications are as follows.

The N11 message in Step 206 does not carry the protocol capability indication information of the access device. That is, after step 206, step 207 to step 210 may be further performed. Further, for a specific implementation process of step 207 to step 210, refer to the specific implementation process of step 1036 to step 1039. Details are not described herein again.

Example (4)

The session management network element obtains the protocol capability indication information of the access device from the user plane network element.

The Example (4) has two examples, which are described respectively as follows.

Example 4-1

The session management network element obtains a protocol capability of the access device using a network element discovery process.

Figure 12:
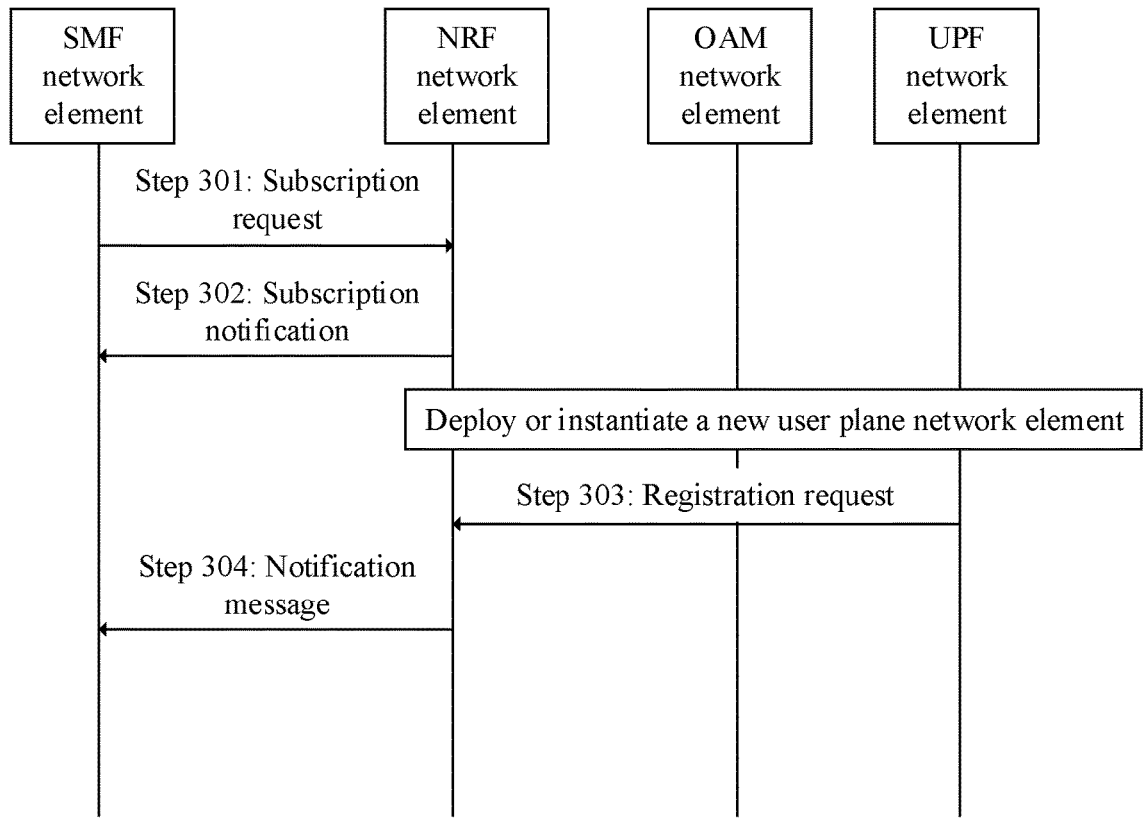
FIG. 12 is a sixth schematic flowchart of a transmission method according to an embodiment of this application.

In this embodiment of this application, for a process in which the session management network element obtains the protocol capability indication information of the access device using the network element discovery process, refer to FIG. 12. It should be understood that FIG. 12 merely lists a process in which the session management network element obtains the protocol capability indication information of the access device. FIG. 12 may be used in combination with the foregoing embodiment.

Step 301: The session management network element sends a subscription request to the NRF. The subscription request carries provisioning information of a target user plane network element.

Step 302: The NRF sends a subscription notification to the session management network element. The subscription notification carries a user plane network element list. A user plane network element in the user plane network element list satisfies a condition in the provisioning information of the target user plane network element in step 301.

When an operations, administration and maintenance (OAM) is instantiated or a new user plane network element is deployed, the OAM may configure provisioning information of the user plane network element on the NRF or the new user plane network element.

When the OAM may configure the provisioning information of the user plane network element on the new user plane network element, the following steps are performed.

Step 303: The new user plane network element sends a registration request to the NRF, where the registration request carries the provisioning information of the user plane network element. The registration request further carries the protocol capability indication information of the access device connected to the user plane network element.

Further, the registration request further carries the protocol capability indication information of the user plane network element.

When the OAM may configure the provisioning information of the user plane network element on the NRF, step 303 may not need to be performed.

Step 304: The NRF sends a notification message to the session management network element. The notification message carries the user plane network element list that satisfies the provisioning information of the target user plane network element in step 301.

Therefore, the session management network element stores the protocol capability indication information of the access device and the protocol capability indication information of the user plane network element. In a subsequent session management procedure, step 103 in this embodiment of this application may be implemented in the following manner. The session management network element determines an identifier of an access device accessed by the terminal, and may determine, based on the protocol capability indication information of the access device that is stored in the session management network element in this example, the protocol capability indication information of the device accessed by the terminal. Further, after selecting the user plane network element, the session management network element may determine, based on the protocol capability of the user plane network element stored in the session management network element in Example 4-1, protocol capability indication information of the user plane network element that provides a service flow packet forwarding service for the terminal.

Example 4-2

The session management network element obtains the protocol capability indication information of the access device using an N4 device connection establishment process.

Figure 13:
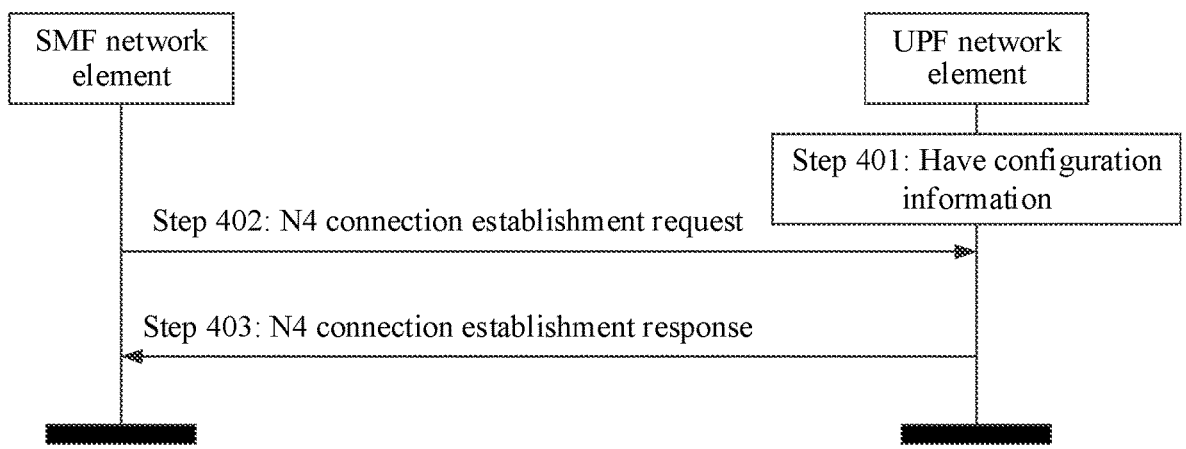
FIG. 13 is a seventh schematic flowchart of a transmission method according to an embodiment of this application.

In this embodiment of this application, for a process in which the session management network element obtains the protocol capability indication information of the access device using the N4 device connection establishment process, refer to FIG. 13. It should be understood that FIG. 13 merely lists a process in which the session management network element obtains the protocol capability indication information of the access device. FIG. 13 may be used in combination with the foregoing embodiment.

Step 401: The user plane network element has configuration information. The configuration information includes the protocol capability indication information of the user plane network element and protocol capability indication information of at least one access device connected to the user plane network element.

Step 402: The session management network element sends an N4 connection establishment request (for example, an N4 association setup request) to the user plane network element. Using the N4 connection, an N4 device connection between the session management network element and the user plane network element is established.

Step 403: The user plane network element sends an N4 connection establishment response to the session management network element. The N4 connection establishment response carries the protocol capability indication information of the user plane network element and the protocol capability indication information of the at least one access device connected to the user plane network element in step 401.

Therefore, in a process of establishing an N4 device connection to the user plane network element, the session management network element may obtain, from the user plane network element, the protocol capability indication information of the user plane network element and the protocol capability indication information of the access device connected to the user plane network element. In a subsequent session management procedure, the session management network element determines an identifier of an access device accessed by the terminal, and may determine, based on the protocol capability indication information of the access device that is stored in the session management network element in this example, the protocol capability indication information of the device accessed by the terminal. Further, after selecting the user plane network element, the session management network element may determine, based on the protocol capability of the user plane network element stored in the session management network element in this example, protocol capability indication information of the user plane network element that provides a service flow packet forwarding service for the terminal.

In this embodiment of this application, obtaining, by the session management network element, protocol capability indication information of the user plane network element includes obtaining, by the session management network element, the protocol capability indication information of the user plane network element from the user plane network element, or obtaining, by the session management network element, the protocol capability indication information of the user plane network element from a network repository function NRF.

For a specific process, refer to the descriptions in Example (3) and Example (4). Details are not described herein again.

The access device sends an NG establishment request to the mobility management network element. The NG establishment request carries the protocol capability indication information of the access device. The mobility management network element stores a mapping relationship between an identifier of the access device and a protocol capability of the access device based on the NG establishment request. The mobility management network element sends an NG establishment response to the access device.

In the session management process, the mobility management network element determines, based on the position information of the terminal, the access device accessed by the terminal. Then, the mobility management network element determines the protocol capability indication information of the access device based on the stored mapping relationship between the identifier of the access device and the protocol capability of the access device. Then, the foregoing step 403 is performed.

Example (5)

The session management network element is triggered.

In the session management process, when the session management network element determines, based on a local policy or according to PCC rules from the PCF, that high-reliability transmission needs to be activated for a service flow packet, the session management network element sends a capability obtaining request message to the access device using the mobility management network element. In response to the capability obtaining request message, the access device sends a capability obtaining response message to the session management network element using the mobility management network element. The capability obtaining response message carries the protocol capability indication information of the access device.

A difference between Manner 2 and Manner 1 lies in: In Manner 1, the access device actively reports the protocol capability indication information. In Manner 2, the access device reports the protocol capability indication information only when the session management network element determines that reliable transmission needs to be activated for a service flow packet. In Manner 1, the protocol capability indication information of the access device actively reported by the access device may be useless information for the session management network element. For example, when the session management network element determines that the redundant transmission does not need to be activated, the session management network element may not need to obtain the protocol capability indication information of the access device.

Manner 3: The session management network element obtains the protocol capability indication information of the access device from the user plane network element.

A specific process is as follows.

Step (a1): The session management network element sends a subscription request to the NRF. The subscription request carries provisioning information of a target user plane network element.

Step (b1): The NRF sends a subscription notification to the session management network element. The subscription notification carries a user plane network element list. A user plane network element in the user plane network element list satisfies a condition in the provisioning information of the target user plane network element in step (a1).

Step (c1): The OAM or the user plane network element deploys a new user plane network element instance. The user plane network element or the OAM configures a user plane network element.

Step (d1): The OAM or the user plane network element sends configuration information of the user plane network element to the NRF. In this case, the OAM or the user plane network element may further send the protocol capability indication information of the access device and the protocol capability indication information of the user plane network element to the NRF.

Step (e1): The NRF sends a notification message to a session management network element. The notification message carries a user plane list conforming to the provisioning information of the target user plane network element.

Manner 4: N3 configuration manner.

The user plane network element has configuration information. The configuration information includes the protocol capability indication information of the user plane network element and protocol capability indication information of at least one access device. The session management network element sends an N4 connection establishment request to the user plane network element. The N4 connection establishment request requests the protocol capability indication information of the user plane network element and protocol capability indication information of an access device accessed by the terminal. The user plane network element sends an N4 connection establishment response to the session management network element. The N4 connection establishment response carries the protocol capability indication information of the user plane network element and the protocol capability indication information of the access device accessed by the terminal. In this way, in a process of establishing an N4 connection to the user plane network element, the session management network element may obtain, from the user plane network element, the protocol capability indication information of the user plane network element and the protocol capability indication information of the access device accessed by the terminal.

In this embodiment of this application, obtaining, by the session management network element, protocol capability indication information of the user plane network element includes obtaining, by the session management network element, the protocol capability indication information of the user plane network element from the user plane network element, or obtaining, by the session management network element, the protocol capability indication information of the user plane network element from the network repository function NRF.

For a specific process, refer to the descriptions in the foregoing Manner 4 and Manner 3. Details are not described herein again.

It should be understood that, regardless of which manner is used by the session management network element to obtain the protocol capability indication information of the access device and the protocol capability indication information of the user plane network element, after the session management network element obtains the protocol capability indication information of the access device and the protocol capability indication information of the user plane network element, step 102 in this embodiment of this application may be implemented in the following manner.

Correspondingly, as shown in any one of FIG. 9 to FIG. 11A and FIG. 11B, step 102 in this embodiment of this application may be implemented in the following manner.

Step 1021: The session management network element manages the user plane connection based on the protocol capability indication information of the access device, the protocol capability indication information of the user plane network element, and the transport network capability list information.

In a possible implementation, step 1021 may be implemented in the following manner. When both the access device and the user plane network element support the GTP-U protocol enhancement, the session management network element establishes, between the access device and the user plane network element, at least two N3 tunnels serving as the user plane connection.

That is, if the protocol capability indication information of the access device indicates that the access device supports the GTP-U protocol enhancement (which may also be represented as GTP-U+) and the protocol capability indication information of the user plane network element indicates that the user plane supports the GTP-U protocol enhancement, the session management network element may determine to perform redundant transmission on a GTP-U layer, that is, the solution shown in FIG. 4.

That is, when both the access device and the user plane network element support the GTP-U protocol enhancement, regardless of whether the transport network between the access device and the user plane network element supports the high-reliability transmission, the session management network element may determine to perform redundant transmission on the GTP-U layer.

In another possible implementation, step 1021 may be implemented in the following manner When the transport network supports the high-reliability transmission, the session management network element establishes, between the access device and the user plane network element, one N3 tunnel serving as the user plane connection.

That is, when the transport network supports the high-reliability transmission, regardless of whether the access device and the user plane network element support the GTP-U protocol enhancement, a solution of performing redundant transmission on the transport layer shown in FIG. 5 may be used.

In still another possible implementation, step 1021 may be implemented in the following manner When the transport network supports the high-reliability transmission and both the access device and the user plane network element support the GTP-U protocol enhancement, the session management network element determines, based on policy information, to establish, between the access device and the user plane network element, at least two N3 tunnels or one N3 tunnel serving as the user plane connection.

That is, if the transport network supports the high-reliability transmission and both the access device and the user plane network element support the GTP-U protocol enhancement, the session management network element may determine, based on the policy information, which one between the solution shown in FIG. 4 and the solution shown in FIG. 5 is used.

For example, the policy information may be pre-stored in the session management network element, or the policy information may be obtained by the session management network element from another network element (for example, the PCF network element). This is not limited in this embodiment of this application.

For example, the policy information may be a priority for performing redundant transmission on the transport layer and a priority for performing redundant transmission on the GTP-U layer. For example, if the priority for performing redundant transmission on the transport layer is higher than the priority for performing redundant transmission on the GTP-U layer, when the transport network supports the high-reliability transmission, even though both the access device and the user plane network element support the GTP-U protocol enhancement, the session management network element still determines to establish, between the access device and the user plane network element, one N3 tunnel serving as the user plane connection. That is, the access device and the user plane network element perform redundant transmission on the transport layer, to implement reliable transmission of a service flow packet.

It should be noted that, if the transport network capability list indication information indicates that the transport network does not support the high-reliability transmission and the access device or the user plane network element does not support the GTP-U protocol enhancement, the session management network element may determine to reject establishment of the user plane connection. That is, the session management network element rejects session management.

As shown in Table 2 below, Table 2 shows high-reliability transmission solutions selected by the session management network element in different cases.

TABLE 2

| High-reliability transmission solution | | | |
| --- | --- | --- | --- |
| Does a protocol capability of an access device support GTP-U+? | Does a protocol capability of a user plane network element support GTP-U+? | Does a protocol capability of a transport network support high-reliability transmission | High-reliability transmission manner determined by a session management network element to use |
| Support | Support | Support | Establish one N3 tunnel or at least two N3 tunnels |
| Support | Support | Not support | At least two N3 tunnels |
| Support | Not support | Support | Establish one N3 tunnel |
| Support | Not support | Not support | Reject establishment of a user plane connection |
| Not support | Support | Support | Establish one N3 tunnel |
| Not support | Support | Not support | Reject establishment of a user plane connection |
| Not support | Not support | Support | Establish one N3 tunnel |
| Not support | Not support | Not support | Reject establishment of a user plane connection |

Figure 14:
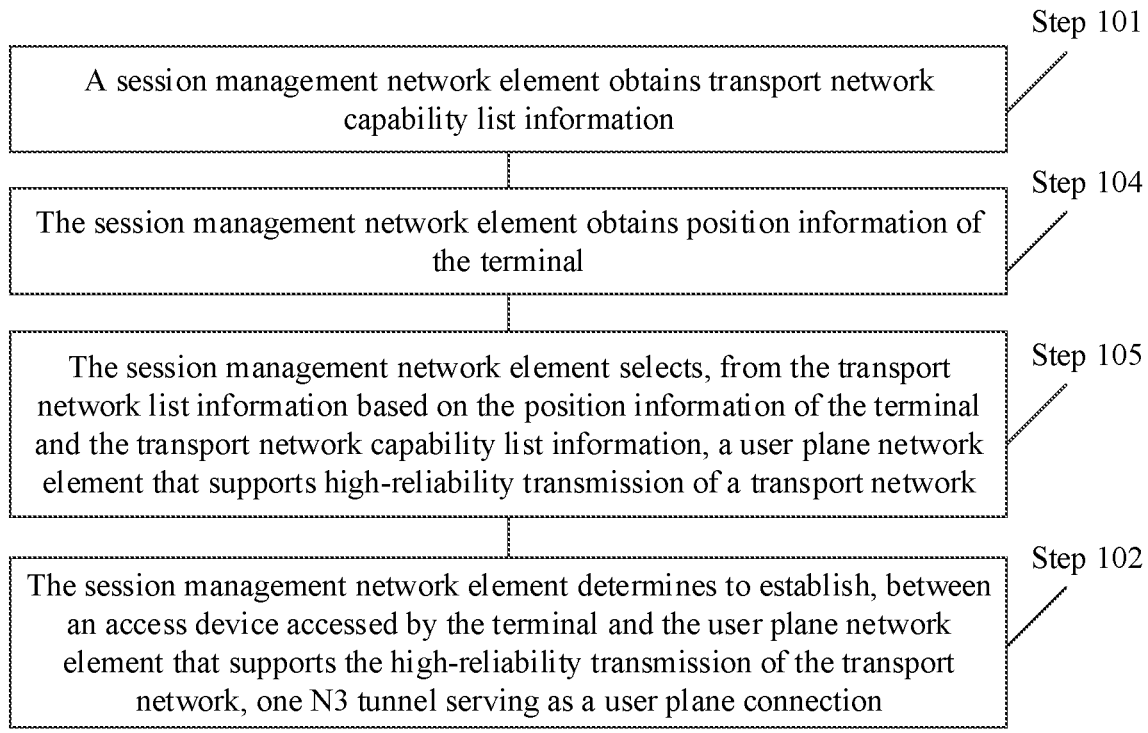
FIG. 14 is an eighth schematic flowchart of a transmission method according to an embodiment of this application.

In another example, when the transport network capability list information indicates whether a transport network between each of at least one access device and at least one user plane network element supports the high-reliability transmission, as shown in FIG. 14, before step 102, the method provided in this embodiment of this application further includes the following steps.

Step 104: The session management network element obtains position information of the terminal.

Further, in a process in which the terminal initiates session management, the session management network element may obtain the position information of the terminal from the mobility management network element. The position information of the terminal is usable for determination an access device of the terminal in at least one access device. For example, the position information of the terminal may be represented by an identifier of the access device.

Step 105: The session management network element selects, from the transport network list information based on the position information of the terminal and the transport network capability list information, a user plane network element that supports the high-reliability transmission of the transport network. It should be understood that the user plane network element selected in step 105 is configured to establish an N3 tunnel.

It should be understood that, after step 104 and step 105 are performed, step 102 may be implemented in the following manner. The session management network element determines to establish, between the access device accessed by the terminal and the user plane network element that supports the high-reliability transmission of the transport network, one N3 tunnel serving as the user plane connection.

Further, the session management network element determines, based on the position information of the terminal, an access device that provides an access service for the terminal, and determines, based on the transport network capability list information, at least one transport network associated with the access device. Then, a transport network that supports the high-reliability transmission is determined in the at least one transport network. Then, a corresponding user plane network element in the transport network that supports the high-reliability transmission is determined as a user plane network element used to establish an N3 tunnel. It should be noted that, if the session management network element determines, based on the position information of the terminal, that a plurality of transport networks associated with the access device exist and the plurality of transport networks all support the high-reliability transmission, the session management network element may select a user plane network element in any transport network of the plurality of transport networks and determine the selected user plane network element as a user plane network element used to establish the N3 tunnel. Certainly, if each of the plurality of transport networks has a priority, the session management network element may use a user plane network element in a transport network with a high priority as the user plane network element used to establish the N3 tunnel.

It should be understood that in this case, step 102 may be implemented in the following manner. The session management network element establishes, between the access device and the user plane network element, one N3 tunnel serving as the user plane connection.

For example, as shown in Table 3, Table 3 shows transport network capability list information.

TABLE 3

| Transport network capability list information | |
| --- | --- |
| Transport network-1 (RAN 1, UPF 1) | Support high-reliability transmission |
| Transport network-2 (RAN 2, UPF 1) | Support high-reliability transmission |
| Transport network-3 (RAN 1, UPF 2) | Not support high-reliability transmission |

Further, the session management network element determines, based on the position information of the terminal, that a base station currently accessed by the terminal is the RAN 1. Then, the session management network element obtains, based on the transport network capability list information shown in Table 2, that transport networks related to the RAN 1 include the transport network-1 and the transport network-3. The transport network-1 supports the high-reliability transmission, and the transport network-3 does not support the high-reliability transmission. In this case, the session management network element may determine to select a UPF 1 in the transport network-1 as the user plane network element for establishing the N3 tunnel.

Figure 15:
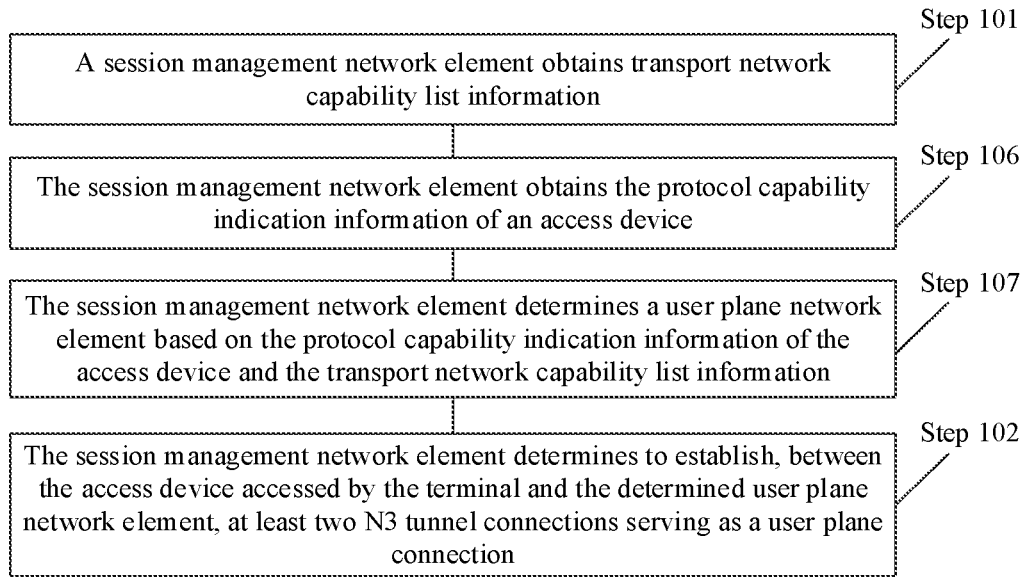
FIG. 15 is a ninth schematic flowchart of a transmission method according to an embodiment of this application.

Step 104 and step 105 mainly describe a case in which a user plane network element in a transport network that supports the high-reliability transmission may be selected when transport networks support the high-reliability transmission. However, in an actual process, it is possible that a transport network does not support the high-reliability transmission. Therefore, in another optional embodiment, as shown in FIG. 15, the method provided in this embodiment of this application further includes the following steps.

Step 106: The session management network element obtains the protocol capability indication information of the access device.

It should be understood that both the access device in step 106 and the access device in step 107 is the access device accessed by the terminal.

Further, for a specific implementation of step 106, refer to the process in which the session management network element obtains the protocol capability indication information of the access device in the foregoing embodiments. Details are not described herein again.

Step 107: The session management network element determines the user plane network element based on the protocol capability indication information of the access device and the transport network capability list information.

In a possible implementation, step 107 in this embodiment of this application may be implemented in the following manner. When the transport network capability list information indicates that there is no user plane network element that supports the high-reliability transmission of the transport network and the access device supports the GTP-U protocol enhancement, determining, by the session management network element, a user plane network element that supports the GTP-U protocol enhancement as the user plane network element. It should be understood that at least two N3 tunnels are established between the user plane network elements finally selected by the session management network element in step 106 and step 107.

Further, the session management network element determines, from the transport network capability list information based on the position information of the terminal, at least one transport network associated with the access device. If the session management network element determines that there is no transport network that supports the high-reliability transmission in the at least one transport network, when the access device supports the GTP-U protocol enhancement, the session management network element may select a user plane network element that supports the GTP-U protocol enhancement as the user plane network element.

It should be noted that, if the session management network element determines that there is no transport network that supports the high-reliability transmission in the at least one transport network, the session management network element may alternatively reject establishment of the user plane connection when the access device supports the GTP-U protocol enhancement and there is no user plane network element that supports the GTP-U protocol enhancement.

For example, as shown in Table 4, Table 4 shows transport network capability list information.

TABLE 4

| Transport network capability list information | |
| --- | --- |
| Transport network-1 (RAN 1, UPF network element 1) | Not support high-reliability transmission |
| Transport network-2 (RAN 2, UPF network element 1) | Support high-reliability transmission |
| Transport network-3 (RAN 1, UPF network element 2) | Not support high-reliability transmission |

For example, in Table 4, the transport network-1 and the transport network-3 do not support the high-reliability transmission. RAN protocol capability indication information obtained by the session management network element indicates that the RAN supports the GTP-U protocol enhancement. UPF protocol capability indication information obtained by the session management network element is as follows. The UPF network element 1 supports the GTP-U protocol enhancement, and the UPF network element 2 and a UPF network element 3 do not support the GTP-U protocol enhancement.

The session management network element determines, based on the position information of the terminal, that the terminal currently accesses the RAN 1. With reference to Table 3, the session management network element determines that transport networks related to the RAN 1 are the transport network-1 and the transport network-3, but neither the transport network-3 nor the transport network-1 supports the high-reliability transmission. Therefore, the session management network element cannot determine, in transport networks, a user plane network element that supports the high-reliability transmission of the transport network. Further, the session management network element may obtain the protocol capability indication information of the RAN 1 based on the manner of obtaining the protocol capability indication information of the access device in step 103. Assuming that the RAN 1 supports the GTP-U protocol enhancement, the session management network element selects a UPF that supports the GTP-U protocol enhancement. For example, assuming that the UPF 1 supports the GTP-U protocol enhancement, a user plane network element finally selected by the session management network element is the UPF 1.

For example, in Table 4, if the RAN 1 supports the GTP-U protocol enhancement, neither the transport network-3 nor the transport network-1 supports the high-reliability transmission and neither the UPF network element 1 nor the UPF network element 3 supports the GTP-U protocol enhancement, the session management network element may determine to reject establishment of the user plane connection.

In a possible implementation, when the transport network capability list information indicates that the transport network does not support the high-reliability transmission and the access device does not support the GTP-U protocol enhancement, the session management network element determines to reject establishment of the user plane connection. In this case, the access device refers to the access device accessed by the terminal.

It should be understood that, if the transport network does not support the high-reliability transmission and the access device accessed by the terminal does not support the GTP-U protocol enhancement, the session management network element may also determine to reject establishment of the user plane connection even though the access device accessed by the terminal is connected to a plurality of user plane network elements and the plurality of user plane network elements all supports the GTP-U protocol enhancement in this case.

Still with further reference to Table 4, if a RAN protocol capability obtained by the session management network element is that the GTP-U protocol enhancement is not supported. The session management network element determines, based on a position of the terminal, that the terminal currently accesses the RAN 1. The session management network element may determine, based on information shown in Table 3, that transport networks associated with the RAN 1 include the transport network-1 and the transport network-3. Neither the transport network-1 nor the transport network-3 supports the high-reliability transmission. Then, further, the session management network element may obtain protocol capability indication information of the RAN 1 based on the manner of obtaining the protocol capability indication information of the access device in step 103. Assuming that the RAN 1 does not support the GTP-U protocol enhancement, the session management network element determines to reject establishment of the user plane connection.

Figure 16:
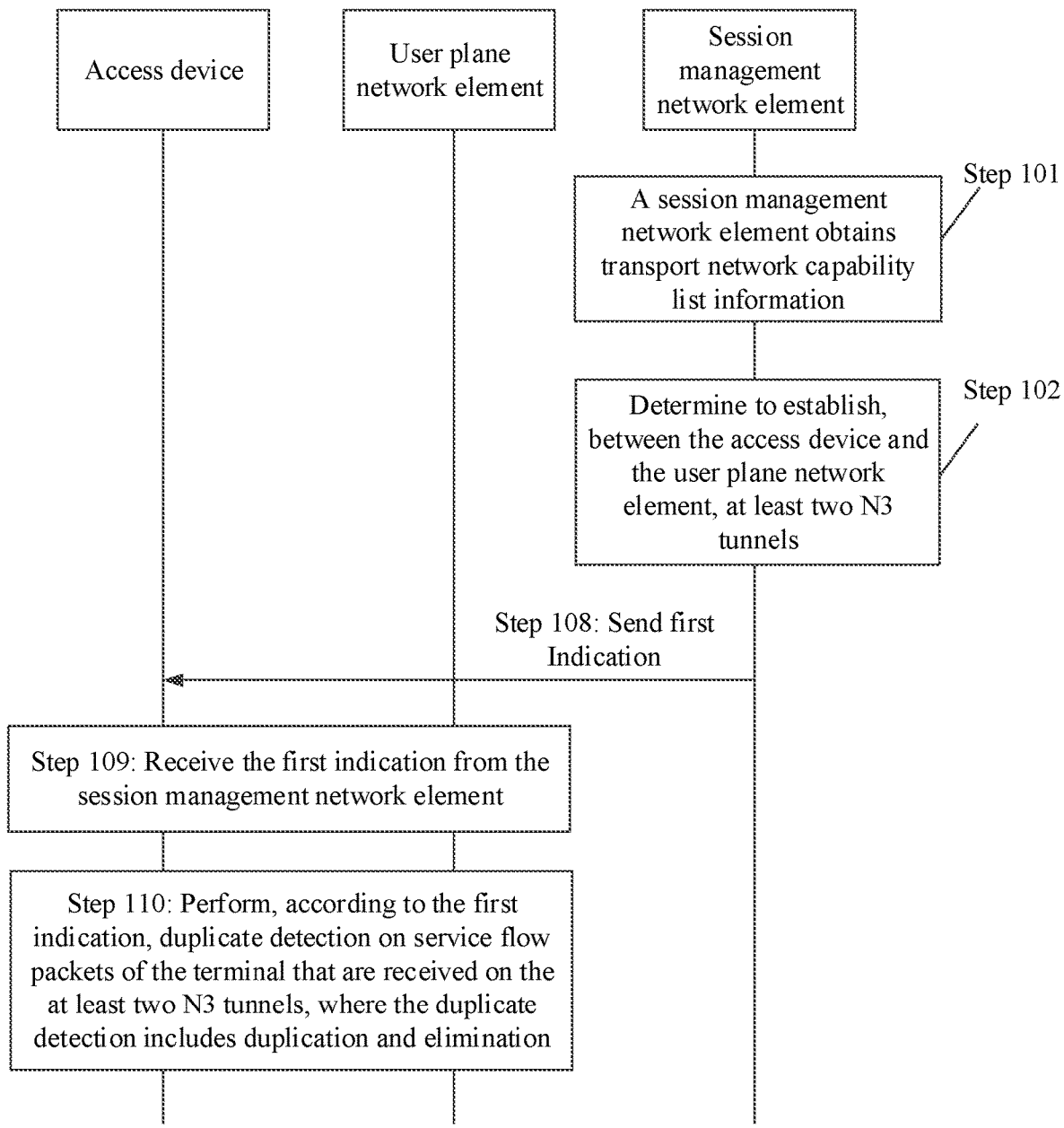
FIG. 16 is a tenth schematic flowchart of a transmission method according to an embodiment of this application.

If the session management network element determines to establish at least two N3 tunnels between the access device and the user plane network element, that is, both the access device and the user plane network element support the GTP-U protocol enhancement, as shown in FIG. 16, the method provided in this embodiment of this application further includes the following steps.

Step 108: The session management network element sends first indication to the access device and the user plane network element, where the first indication indicates the access device to duplicate a service flow packet of the terminal on the GTP-U layer and eliminate a duplicated serve flow packet on the GTP-U layer, and indicates the user plane network element to duplicate a service flow packet of the terminal on the GTP-U layer and eliminate a duplicated serve flow packet on the GTP-U layer.

Further, the session management network element may further send tunnel information of the at least two N3 tunnels to the access device and the user plane network element such that the access device/the user plane network element determines to transmit, using the at least two N3 tunnels indicated by the tunnel information of the at least two N3 tunnels, the service flow packet and a service flow packet that is obtained after the duplication.

For the process described in step 108, refer to descriptions in the other approaches. Details are not described herein.

Step 109: The access device or the user plane network element receives the first indication from the session management network element.

Step 110: The access device or the user plane network element performs, according to the first indication, duplication detection on service flow packets of the terminal that are received on the at least two N3 tunnels. The duplication detection includes duplication and elimination. To be specific, if a service flow packet received on the at least two N3 tunnels is a duplicate service flow packet or a duplicate of a buffered service flow packet, the access device or the user plane network element may discard the duplicate service flow packet.

It should be noted that, if the at least two N3 tunnels are established by the session management network element, the session management network element may further send the tunnel information of the at least two N3 tunnels to the access device and the user plane network element such that the access device/the user plane network element determines to transmit, using the at least two N3 tunnels indicated by the tunnel information of the at least two N3 tunnels, the service flow packet duplicated on the GTP-U layer and the service flow packet that is obtained after the duplication. In addition, the access device/the user plane network element may further perform duplication detection on the duplicated service flow packet and the service flow packet obtained after the duplication, where the duplicated service flow packet and the service flow packet obtained after the duplication are received in the at least two N3 tunnels indicated by the tunnel information of the at least two N3 tunnels.

If the session management network element determines to establish one N3 tunnel between the access device and the user plane network element, in this embodiment of this application, the session management network element may establish one N3 tunnel between the access device and the user plane network element, that is, does not need to indicate the user plane network element and the access device to allocate redundant tunnel information. Likewise, the UPF/the RAN does not need to be instructed to perform duplication detection on a service flow packet or duplicate the service flow packet.

If the session management network element determines to establish one N3 tunnel between the access device and the user plane network element, in this embodiment of this application, the session management network element may not need to indicate the user plane network element and the access device to allocate redundant tunnel information. Likewise, the UPF/the RAN does not need to be instructed to perform duplication detection on a service flow packet or duplicate the service flow packet.

Figure 17:
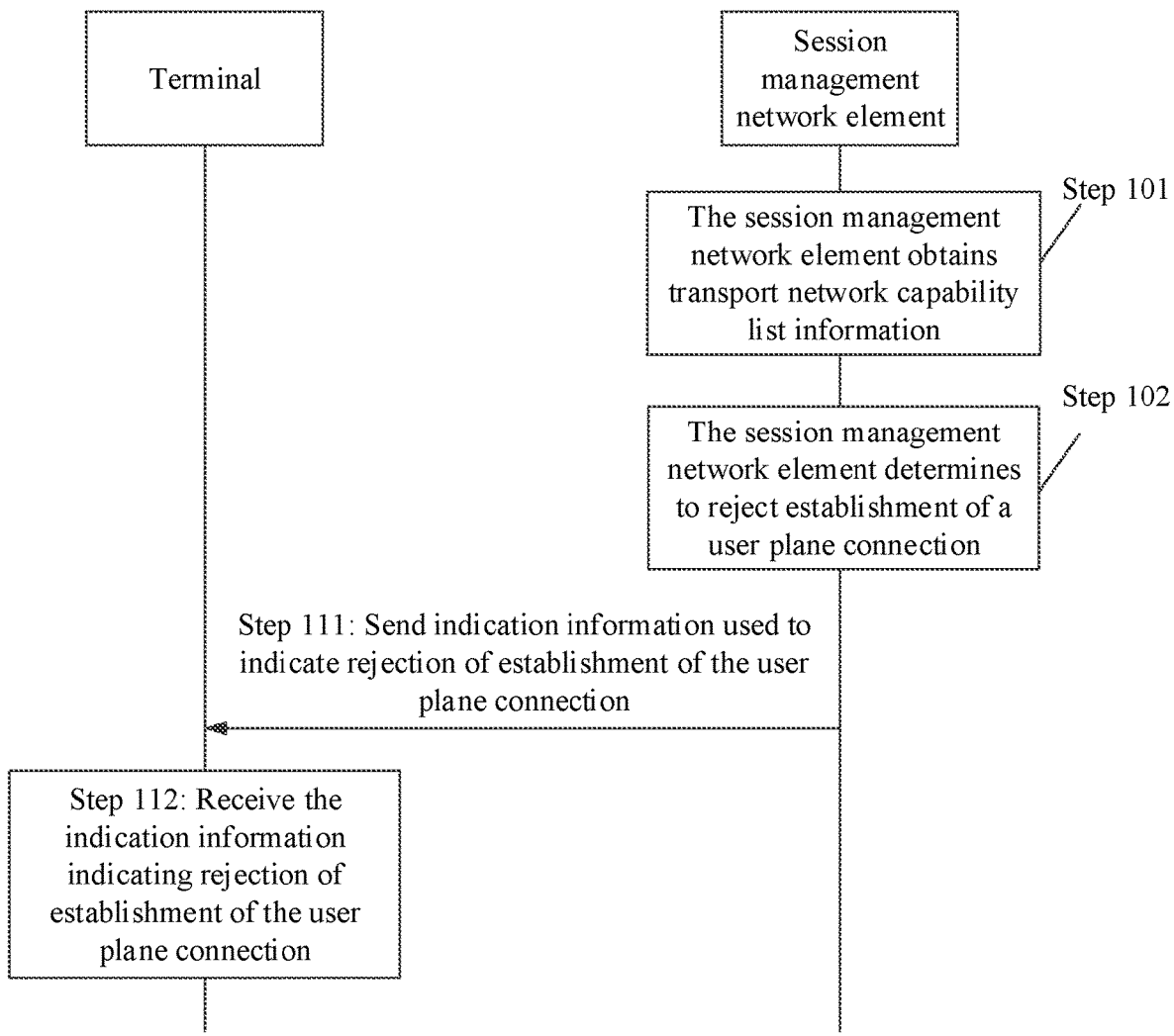
FIG. 17 is an eleventh schematic flowchart of a transmission method according to an embodiment of this application.

If the session management network element determines to reject establishment of the user plane connection, as shown in FIG. 17, the method provided in this embodiment of this application further includes the following steps.

Step 111: When the transport network capability list information indicates that the transport network does not support the high-reliability transmission and any one or more of the access device or the user plane network element do not support the GTP-U protocol enhancement, the session management network element sends, to the terminal, indication information indicating rejection of establishment of the user plane connection. This helps the terminal determine, in a timely manner, that a network side rejects establishment of the user plane connection.

Step 112: The terminal receives indication information that comes from the session management network element and that indicates rejection of establishment of the user plane connection.

It should be understood that the session management network element may further send, to the user plane network element and the access device, a cause value for rejecting establishment of the user plane connection.

In a possible implementation, in step 101 in this embodiment of this application, the obtaining, by a session management network element, transport network capability list information may be implemented in the following manner.

Example (6)

The transport network capability list information is preconfigured in the session management network element.

The OAM configures the transport network capability list information in the session management network element. In a session management process, the session management network element may determine, based on the access device accessed by the terminal and a user plane network element selected by the session management network element for the terminal, a target transport network between the access device accessed by the terminal and the selected user plane network element. Further, the session management network element obtains, based on an identifier of the target transport network, protocol capability information of the target transport network from the preconfigured transport network capability list information. It should be understood that the transport network capability list information indicates whether the transport network supports the high-reliability transmission.

For example, the transport network capability list information includes protocol capability indication information of the transport network 1 (a transport network between the access device 1 and the user plane network element 1), a capability of the transport network 2 (a transport network between the access device 1 and the user plane network element 2), and a capability for the transport network 3 (a transport network between the access device 2 and the user plane network element 1). If the session management network element determines that the terminal accesses the access device 1 and a user plane network element selected for the terminal in the session management process is the user plane network element 1, the session management network element determines that the target transport network is the transport network 1 and further, may determine a capability of the transport network 1 in the transport network capability list information.

Example (7)

The session management network element obtains the transport network capability list information from the NRF or the user plane network element.

For example, the NRF may obtain the transport network capability list information from a registration request sent by the user plane network element or from the OAM. Further, the session management network element obtains the transport network capability list information from the NRF in a network element discovery stage.

For example, in a process of establishing the N4 device connection, the session management network element obtains the transport network capability list information from the user plane network element. In a session management process, the session management network element determines a target transport network based on the access device accessed by the terminal and the user plane network element selected by the session management network element, and determines, based on the obtained transport network capability list information, a transport network capability corresponding to the transport network.

The foregoing describes the solutions in this embodiment of this application mainly from a perspective of interaction between network elements. It may be understood that, to implement the foregoing functions, the network elements such as the session management network element, the user plane network element, and the access device each include a corresponding hardware structure and/or a software module for performing each function. A person skilled in the art should easily be aware that, in combination with the examples described in the embodiments disclosed in this specification, units, and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the session management network element, the user plane network element, and the access device may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this application, unit division is performed in an example manner, and is merely a logical function division. In actual implementation, another division manner may be used.

The foregoing describes the method in the embodiments of this application with reference to FIG. 7 to FIG. 17. The following describes a transmission apparatus that is provided in an embodiment of this application and that performs the foregoing method. A person skilled in the art may understand that the method and the apparatus may be mutually combined and referenced. The transmission apparatus provided in this embodiment of this application may perform the method performed by a sending end in the foregoing communication method, that is, the steps performed by the session management network element. Another transmission apparatus may execute the method performed by a receiving end in the communication method in the foregoing embodiments, that is, the steps executed by the access device. Still another transmission apparatus may perform the method performed by the receiving end in the communication method in the foregoing embodiments, that is, the steps performed by user plane network element.

Description is made below using an example in which function modules are divided based on corresponding functions.

Figure 18:
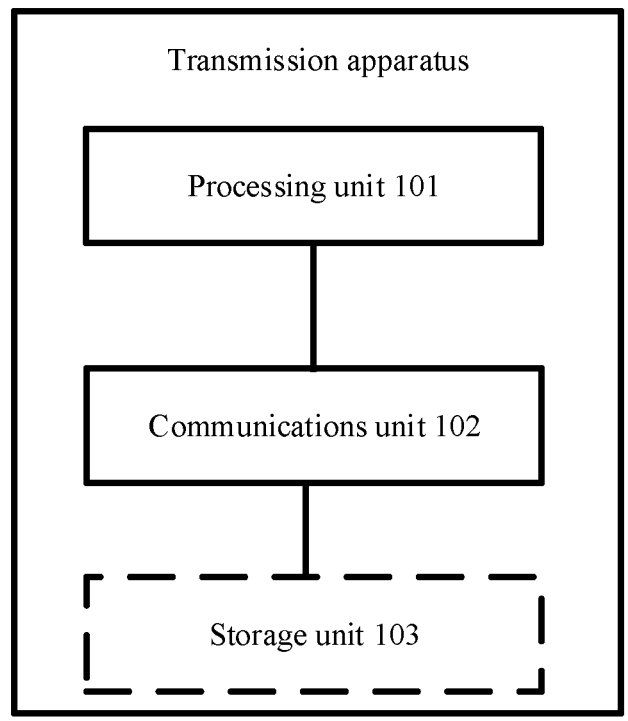
FIG. 18 is a schematic structural diagram of a transmission apparatus according to an embodiment of this application.

FIG. 18 is a schematic structural diagram of a transmission apparatus according to an embodiment of this application. The transmission apparatus may be any one of a session management network element, a user plane network element, and an access device in this embodiment of this application, or may be a chip applied to the session management network element, or a chip in the user plane network element, or a chip the access device. The transmission apparatus includes a processing unit 101 and a communications unit 102. The communications unit 102 is configured to support the transmission apparatus in performing a step of sending or receiving information. The processing unit 101 is configured to support the transmission apparatus in performing a step of processing information.

In an example in which the transmission apparatus is the session management network element or a chip or a chip system applied to the session management network element, the communications unit 102 is configured to support the transmission apparatus in performing step 101 in the foregoing embodiments. The processing unit 101 is configured to support the transmission apparatus in performing step 102 in the foregoing embodiments.

In a possible embodiment, the communications unit 102 is further configured to support the transmission apparatus in performing step 103, step 1037, step 301, step 402, step 104, step 106, and step 108 in the foregoing embodiments. The processing unit 101 is further configured to support the transmission apparatus in performing step 1036, step 1021, step 105, and step 107 in the foregoing embodiments.

In another example, the transmission apparatus is the access device or the chip or the chip system applied to the access device. In this case, the communications unit 102 is configured to support the transmission apparatus in performing step 109 in the foregoing embodiments.

In a possible embodiment, the communications unit 102 is further configured to support the transmission apparatus in performing step 1031, step 1034, step 1038, step 1039, step 201, and step 204 in the foregoing embodiments. The processing unit 101 is configured to support the transmission apparatus in performing step 110 in the foregoing embodiments.

It should be understood that, if the transmission apparatus is the access device or the chip or the chip system applied to the access device, the processing unit 101 is an optional unit.

In a possible embodiment, the transmission apparatus may further include a storage unit 103. The processing unit 101, the communications unit 102, and the storage unit 103 are connected using a communications bus.

The storage unit 103 may include one or more memories. The memory may be a component configured to store a program or data in one or more devices or circuits.

The storage unit 103 may exist independently, and is connected, using a communications bus, to the processing unit 101 of the transmission apparatus. The storage unit 103 may alternatively be integrated with the processing unit.

The transmission apparatus may be used in a communications device, a circuit, a hardware assembly, or a chip.

For example, the transmission apparatus may be the chip or the chip system of the session management network element or the chip or the chip system of the access device in the embodiments of this application. In this case, the communications unit 102 may be an input or output interface, a pin, a circuit, or the like. For example, the storage unit 103 may store a computer-executable instruction in the method on a session management network element side and in the method on an access device side such that the processing unit 101 performs the method on the session management network element side and the method on the access device side in the foregoing embodiments. The storage unit 103 may be a register, a cache, a RAM, or the like. The storage unit 103 may be integrated together with the processing unit 101. The storage unit 103 may be a ROM or another type of static storage device that can store static information and an instruction, and the storage unit 103 may be independent of the processing unit 101.

An embodiment of this application provides a transmission apparatus. The transmission apparatus includes one or more modules configured to implement the method in step 101 to step 112. The one or more modules may correspond to the steps of the method in step 101 to step 112. Further, in this embodiment of this application, for each step in the method performed by the session management network element, there is a unit or module for performing each step in the method in the session management network element. For each step in the method performed by the access device, there is a unit or module for performing each step in the method in the access device. For example, a module for controlling or processing an action of the transmission apparatus may be referred to as a processing module, and a module that performs a step of processing a message or data on the transmission apparatus side may be referred to as a communications module.

For example, when implemented using an entity apparatus, the processing unit 101 of the transmission apparatus shown in FIG. 18 may be the processor 41 or the processing 45 shown in FIG. 6, the communications unit 102 may be the communications interface 43 shown in FIG. 6, and the storage unit 103 may be the memory 42. Further, in FIG. 6, for example, the communications device is the session management network element or the chip applied to the session management network element. In this case, the communications interface 43 is configured to support the transmission apparatus in performing step 101 in the foregoing embodiments. The processor 41 or the processor 45 is configured to support the transmission apparatus in performing step 102 in the foregoing embodiments.

In a possible embodiment, the communications interface 43 is further configured to support the communications device shown in FIG. 6 in performing step 103, step 1037, step 301, step 402, step 104, step 106, and step 108 in the foregoing embodiments. The processor 41 or the processor 45 is further configured to support the communications device shown in FIG. 6 in performing step 1036, step 1021, step 105, and step 107 in the foregoing embodiments.

In another example, the transmission apparatus may be the access device or the chip or the chip system applied to the access device. In this case, the communications interface is configured to support the communications device shown in FIG. 6 in performing step 106 in the foregoing embodiments. The processor 41 or the processor 45 is configured to support the transmission apparatus in performing step 105 in the foregoing embodiments.

In a possible embodiment, the communications interface 43 is further configured to support the communications device shown in FIG. 6 in performing step 109 in the foregoing embodiments. The processor 41 or the processor 45 is configured to support the communications device shown in FIG. 6 in performing step 110 in the foregoing embodiments. In a possible embodiment, the communications interface 43 is further configured to support the communications device shown in FIG. 6 in performing step 1031, step 1034, step 1038, step 1039, step 201, and step 204 in the foregoing embodiments.

Figure 19:
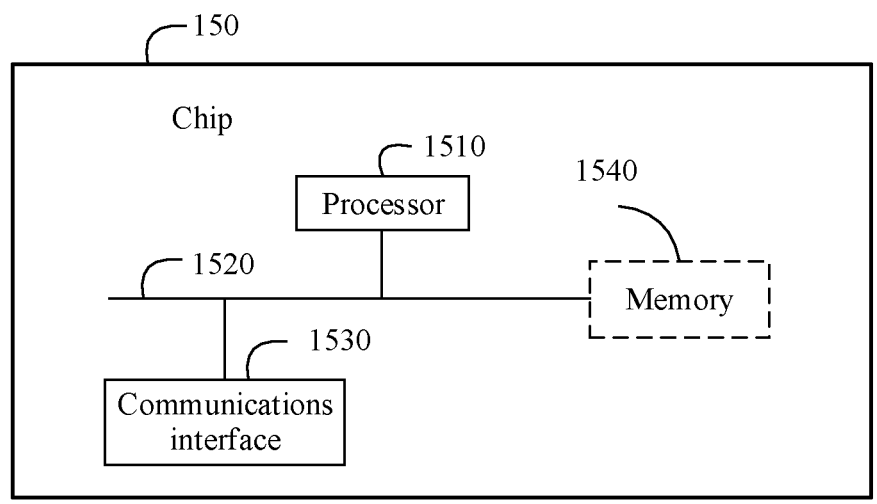
FIG. 19 is a schematic structural diagram of a chip according to an embodiment of this application.

FIG. 19 is a schematic structural diagram of a chip 150 according to an embodiment of the present disclosure. The chip 150 includes one or more processors 1510 and one or more communications interfaces 1530.

In a possible embodiment, the chip 150 shown in FIG. 19 further includes a memory 1540. The memory 1540 may include a read-only memory and a random access memory, and provide an operation instruction and data to the processor 1510. A part of the memory 1540 may further include a non-volatile RAM (NVRAM).

In some implementations, the memory 1540 stores the following elements, an executable module or a data structure, or a subset thereof, or an extended set thereof.

In this embodiment of the present disclosure, a corresponding operation is performed by invoking the operation instruction stored in the memory 1540 (where the operation instruction may be stored in an operating system).

In a possible implementation, structures of the session management network element, a second control plane network element, and a chip used by a first terminal are similar, and different apparatuses may implement respective functions using different chips.

The processor 1510 controls operations of the session management network element, the second control plane network element, and the first terminal, and the processor 1510 may also be referred to as a CPU. The memory 1540 may include a ROM and a RAM, and provide an instruction and data to the processor 1510. A part of the memory 1540 may further include an NVRAM. For example, in application, the communications interface 1530 and the memory 1540 are coupled together using a bus system 1520. In addition to a data bus, the bus system 1520 may further include a power bus, a control bus, a status signal bus, or the like. However, for clear description, various types of buses in FIG. 19 are marked as the bus system 1520.

The communications unit may be interface circuits or communications interfaces of the apparatus, and are configured to receive a signal from another apparatus. For example, when the apparatus is implemented in a chip manner, the communications unit is an interface circuit or a communications interface used by the chip to receive a signal from or send a signal to another chip or apparatus.

The method disclosed in the foregoing embodiments of the present disclosure may be applied to the processor 1510, or implemented by the processor 1510. The processor 1510 may be an integrated circuit chip and has a signal processing capability. In an implementation process, steps in the foregoing methods can be implemented using a hardware integrated logic circuit in the processor 1510, or using instructions in a form of software. The processor 1510 may be a general purpose processor, a digital signal processor (DSP), an ASIC, a field-programmable gate array (FPGA) or another programmable logic device, a discrete gate or transistor logic device, or a discrete hardware component. It may implement or perform the methods, the steps, and logical block diagrams that are disclosed in the embodiments of the present disclosure. The general purpose processor may be a microprocessor, or the processor may be any conventional processor or the like. Steps of the methods disclosed with reference to the embodiments of the present disclosure may be directly executed and accomplished using a hardware decoding processor, or may be executed and accomplished using a combination of hardware and software modules in the decoding processor. A software module may be located in a mature storage medium in the art, such as a RAM, a flash memory, a ROM, a programmable ROM, an EEPROM, a register, or the like. The storage medium is located in the memory 1540, and a processor 1510 reads information in the memory 1540 and completes the steps in the foregoing methods in combination with hardware of the processor.

In a possible implementation, the communications interface 1530 is configured to perform receiving and sending steps of the session management network element, the access device, and the user plane network element in the embodiment shown in FIG. 7 to FIG. 17. The processor 1510 is configured to perform processing steps of the session management network element, the access device, and the user plane network element in the embodiment shown in FIG. 7 to FIG. 17.

In the foregoing embodiment, the instruction that is stored in the memory and that is to be performed by the processor may be implemented in a form of a computer program product. The computer program product may be written in the memory in advance, or may be downloaded and installed in the memory in a form of software.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, DVD), a semiconductor medium (for example, a solid-state drive (SSD)), or the like.

An embodiment of this application further provides a computer-readable storage medium. The method described in the foregoing embodiment may be all or partially implemented using software, hardware, firmware, or any combination thereof. If the method is implemented in software, the functions serving as one or more instructions or code may be stored or transmitted on a computer-readable medium. The computer-readable mediums may include a computer storage medium and a communications medium, and may further include any medium that can transport a computer program from one place to another. The storage medium may be any target medium that can be accessed by a computer.

In a possible design, the computer-readable medium may include a RAM, a ROM, an EEPROM, a CD-ROM, or another optical disc storage, a magnetic disk storage or another magnetic storage device, or the computer-readable medium is used to carry required program code that is stored in a form of an instruction or a data structure, and the computer-readable medium may be accessed by the computer. In addition, any connection is appropriately referred to as a computer-readable medium. For example, if a coaxial cable, an optical fiber cable, a twisted pair, a DSL, or wireless technologies (such as infrared, radio, and a microwave) are used to transmit software from a website, a server, or another remote source, the coaxial cable, the optical fiber cable, the twisted pair, the DSL or wireless technologies such as infrared, radio and a microwave are included in a definition of the medium. Magnetic disks and optical discs used in this specification include a CD, a laser disk, an optical disc, a DVD, a FLOPPY DISK, and a BLU-RAY DISC, where the magic disks generally magnetically reproduce data, and the optical discs optically reproduce data using laser. Combinations of the foregoing mediums should also be included within the scope of computer-readable mediums.

An embodiment of this application further provides a computer program product. The method described in the foregoing embodiment may be all or partially implemented using software, hardware, firmware, or any combination thereof. When the method is implemented in software, the method may be all or partially implemented in a form of a computer program product. The computer program product includes one or more computer instructions. When the foregoing computer program instruction is loaded and executed on a computer, the procedures or functions described in the foregoing method embodiments are all or partially generated. The computer may be a general-purpose computer, a special-purpose computer, a computer network, a base station, a terminal, or another programmable apparatus.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A transmission method comprising:
   obtaining, by a session management device, capability information indicating whether a transport network supports redundant transmission at a transport layer;
   selecting, by the session management device, a user plane device in the transport network based on the capability information; and
   managing, by the session management device, a user plane connection of a terminal based on the capability information, wherein the user plane connection is between an access device and the user plane device, wherein the user plane connection is usable for transmitting a service flow packet of the terminal, wherein the access device and the user plane device support a General Packet Radio Service (GPRS) Tunneling Protocol (GTP)-User Plane (GTP-U) protocol, and wherein managing the user plane connection comprises establishing one N3 GTP-U tunnel serving as the user plane connection between the access device and the user plane device when the capability information indicates that the transport network supports the redundant transmission at the transport layer.

2. The transmission method of claim 1, wherein obtaining the capability information comprises obtaining, by the session management device, the capability information configured in the session management device.

3. The transmission method of claim 1, wherein obtaining the capability information comprises:
   sending, by the user plane device, the capability information to the session management device; and
   obtaining, by the session management device, the capability information from the user plane device.

4. The transmission method of claim 1, wherein the capability information indicates that the transport network supports the redundant transmission of user plane data at the transport layer, wherein establishing the one N3 tunnel comprises establishing a single GTP-U tunnel, and wherein the user plane device supports the redundant transmission at the transport layer.

5. The transmission method of claim 4, wherein the transport network comprises two independent transmission paths between the access device and the user plane device.

6. The transmission method of claim 5, wherein each of the two independent transmission paths connects a router or a switch between the access device and the user plane device.

7. The transmission method of claim 1, further comprising obtaining, by the session management device, position information of the terminal, wherein selecting the user plane device comprises selecting, by the session management device, the user plane device based on the position information.

8. The transmission method of claim 1, further comprising:
   duplicating, by a function of the user plane device, first downlink data on the transport layer to obtain second downlink data, and sending, by the function of the user plane device, the first downlink data and the second downlink data on the user plane connection, wherein the function of the user plane device is a separate entity independent of the user plane device or is integrated in the user plane device; or
   receiving, by the function of the user plane device, first uplink data and second uplink data on the user plane connection, and eliminating, by the function of the user plane device, duplicated data from the first uplink data and the second uplink data.

9. The transmission method of claim 1, further comprising:
   receiving, by a function of the access device, first downlink data and second downlink data on the user plane connection, and eliminating, by the function of the access device, duplicated data from the first downlink data and the second downlink data, wherein the function of the access device is a separate entity independent of the access device or is integrated on the access device; or
   duplicating, by the function of the access device, first uplink data on the transport layer to obtain second uplink data, and sending, by the function of the access device, the first uplink data and the second uplink data on the user plane connection.

10. The transmission method of claim 1, further comprising obtaining, by the session management device, protocol capability indication information indicating whether at least one of the access device or the user plane device supports the GTP-U protocol.

11. The transmission method of claim 10, wherein managing the user plane connection further comprises establishing, by the session management device, a plurality of N3 tunnels serving as the user plane connection between the access device and the user plane device when both the access device and the user plane device support the GTP-U protocol.

12. The transmission method of claim 10, further comprising sending, by the session management device to the access device, indication information indicating rejection of establishment of the user plane connection when the capability information indicates that the transport network does not support the redundant transmission at the transport layer and at least one of the access device or the user plane device does not support the GTP-U protocol.

13. A session management device comprising:
 a memory configured to store instructions; and
 a processor coupled to the memory and configured to execute the instructions to:
  obtain capability information indicating whether a transport network supports redundant transmission at a transport layer;
  select a user plane device in the transport network based on the capability information; and
  manage a user plane connection of a terminal based on the capability information, wherein the user plane connection is between an access device and the user plane device, wherein the user plane connection is usable for transmitting a service flow packet of the terminal, wherein the access device and the user plane device support a General Packet Radio Service (GPRS) Tunneling Protocol (GTP)-User Plane (GTP-U) protocol, and wherein managing the user plane connection comprises establishing one N3 GTP-U tunnel serving as the user plane connection between the access device and the user plane device when the capability information indicates that the transport network supports the redundant transmission at the transport layer.

14. The session management device of claim 13, wherein the session management device is further configured to obtain the capability information configured in the session management device.

15. The session management device of claim 13, wherein the session management device is further configured to obtain the capability information from the user plane device.

16. The session management device of claim 13, wherein the capability information indicates that the transport network supports the redundant transmission at the transport layer, and wherein the user plane device is configured to support the redundant transmission at the transport layer by implementing a replication protocol function to duplicate packets on the transport layer and/or eliminate duplicated packets on the transport layer.

17. The session management device of claim 16, wherein the transport network comprises two independent transmission paths between the access device and the user plane device.

18. The session management device of claim 13, wherein the session management device is further configured to:
 obtain position information of the terminal; and
 select the user plane device further based on the position information of the terminal.

19. The session management device of claim 13, wherein the user plane device comprises a function configured to:
 duplicate first downlink data on the transport layer to obtain second downlink data, and send the first downlink data and the second downlink data on the user plane connection; or
 receive first uplink data and second uplink data on the user plane connection, and eliminate duplicated data from the first uplink data and the second uplink data.

20. The session management device of claim 13, wherein the access device comprises a function configured to:
 receive first downlink data and second downlink data on the user plane connection, and eliminate duplicated data from the first downlink data and the second downlink data; or
 duplicate first uplink data on the transport layer to obtain second uplink data, and send the first uplink data and the second uplink data on the user plane connection.

* * * * *